(12) United States Patent
Ochiai

(10) Patent No.: US 6,862,688 B2
(45) Date of Patent: Mar. 1, 2005

(54) FAULT HANDLING SYSTEM AND FAULT HANDLING METHOD

(75) Inventor: Shinichi Ochiai, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 600 days.

(21) Appl. No.: 09/769,367

(22) Filed: Jan. 26, 2001

(65) Prior Publication Data

US 2001/0011358 A1 Aug. 2, 2001

(30) Foreign Application Priority Data

Jan. 27, 2000 (JP) ........................................ 2000-019187

(51) Int. Cl.[7] .............................................. G06F 11/00
(52) U.S. Cl. ............................. 714/2; 714/45; 714/774
(58) Field of Search ............................. 714/45, 2, 774, 714/1

(56) References Cited

U.S. PATENT DOCUMENTS

| | | | | |
|---|---|---|---|---|
| 5,594,861 A | * | 1/1997 | Jonsson et al. | 714/2 |
| 5,673,386 A | * | 9/1997 | Batra | 714/38 |
| 5,841,964 A | * | 11/1998 | Yamaguchi | 714/45 |
| 6,012,149 A | * | 1/2000 | Stavran | 714/2 |
| 6,038,679 A | * | 3/2000 | Hanson | 714/5 |
| 6,334,193 B1 | * | 12/2001 | Buzsaki | 714/2 |
| 6,606,716 B1 | * | 8/2003 | Vrhel et al. | 714/32 |

FOREIGN PATENT DOCUMENTS

| | | |
|---|---|---|
| JP | 58-129548 | 8/1983 |
| JP | 61-213932 | 9/1986 |
| JP | 63-253442 | 10/1988 |
| JP | 01-181295 | 7/1989 |
| JP | 1309157 | 12/1989 |
| JP | 4251342 | 7/1992 |
| JP | 4287460 | 10/1992 |
| JP | 04-332227 | 11/1992 |
| JP | 6222944 | 12/1994 |
| JP | 08-194558 | 7/1996 |
| JP | 08-328979 | 12/1996 |
| JP | 9305440 | 11/1997 |
| JP | 10171683 | 6/1998 |
| JP | 11-338730 | 12/1999 |

\* cited by examiner

*Primary Examiner*—Robert Beausoliel
*Assistant Examiner*—Marc Duncan
(74) *Attorney, Agent, or Firm*—Birch, Stewart, Kolasch & Birch, LLP

(57) ABSTRACT

A fault handling system which detects a fault occurred in an information processing system, and performs fault handling processing corresponding to the detected fault in order to recover from the detected fault condition. The fault handling system is provided with a fault management table for storing operation mode information indicating the operating status of the information processing system and a type of fault handling processing corresponding to the detected fault in the information processing system in such a manner as to relate the operation mode information with the type of the fault handling processing, and a fault handling facility for determining the operation mode information and obtaining the type of fault handling processing corresponding to the operation mode information determined by referring to the fault management table.

24 Claims, 17 Drawing Sheets

FAULT HANDLING SYSTEM AND FAULT HANDLING METHOD

BACKGROUND OF THE INVENTION

1. Field of the Invention

The present invention relates to a system for handling a fault or failure condition detected in the operation of a software or hardware provided in an information processing system, in which the system detects a fault or failure condition, records the information of a detected fault or failure condition, and performs fault handling processing in order to recover from the detected fault or failure condition. More particularly, the present invention relates to a fault handling system and a fault handling method in which the operation or type of fault handling processing can be changed adaptively according to the operating status of the information processing system.

2. Description of the Related Art

A conventional example of the fault handling system for information processing system may be disclosed in Japanese Unexamined Patent Publication No. Hei 10-171683. FIG. 17 of the accompanying drawings shows a block diagram of the conventional example of the fault handling system to be applied to an information processing system.

Referring to FIG. 17, an information processing system 1 includes a fault detection circuit 11 and a fault detail recording circuit 12 for fault handling processing. Upon detection of a fault by the fault detection circuit 11, the fault detail recording circuit 12 selects one of a plurality of external storage devices 2-1 through 2-n by referring to a management table 13, an initial failure information recorded flag 14 and a selection pointer 15, and records the information of the detected fault.

The conventional fault handling system for information processing system discussed above poses a problem of failing to change a method or type of recording fault handling processing or fault recovery processing adaptively according to a type of fault. Furthermore, various types of faults may occur in various operating conditions or phases of the information processing system, such as a system development operation phase, a test verification operation phase, a maintenance operation phase, or a substantial operation phase. Consequently, different types of fault information recording processing are fault recovery processing are to be required for different types of faults occurred at different operating phases of the information processing system. Further, in this respect, the conventional fault handling system has a problem of failing to change the types of the fault handling processing adaptively according to the operating phase or status of the information processing system. It is required to analyze a fault by recording the information of the fault in the test verification operation phase, even if the fault is only a minor one, and by stopping the operation of the information processing system when detecting the fault occurred, for example. On the other hand, once the information processing system started an operation, it is not required to report any fault other than a critical fault which may cause a negative effect to the operation of the information processing system for the purpose of improving the maintainability of the system operation. For that reason, it is also required in that stage to operate the fault recovery processing in such a manner as not to interrupt the continuity of the system operation as much as possible.

Another problem with the conventional fault handling system for information processing system is that the fault handling processing is not allowed to be changed adaptively according to the system configuration of the information processing system. For example, the information processing system may be connected with a console or may be included in a duplex system. In those cases, it is desirable or needed to change the type of the fault handling processing adaptively according to the system configuration.

SUMMARY OF THE INVENTION

An object of the present invention is to solve such problems discussed above.

According to one aspect of the present invention, a fault handling system, which detects a fault in an information processing system, and performs fault handling processing corresponding to a detected fault in the information processing system, may include, a fault management table for storing operation mode information indicating an operating status of the information processing system and a type of the fault handling processing corresponding to the detected fault in the information processing system, the operation mode information being related with the type of the fault handling processing, and a fault handling facility for determining the operation mode information and for obtaining the type of the fault handling processing corresponding to the operation mode information determined from the fault management table.

The fault handling system may further include a fault detecting section for detecting a fault in the information processing system, for determining fault class information indicating a degree of seriousness of the fault detected and for outputting the fault class information determined to the fault handling facility, wherein the fault management table may store the fault class information and the type of the fault handling processing, the operation mode information being related with the type of the fault handling processing, and wherein the fault handling facility may input the fault class information from the fault detecting section and obtain the type of the fault handling processing corresponding to the fault class information inputted from the fault management table.

The fault handling system may further include a fault handling section including a module for providing the fault handling processing, wherein the fault handling facility may notify the fault handling section of the type of the fault handling processing obtained, and wherein the fault handling section may start the module for providing the type of the fault handling processing notified.

The type of the fault handling processing may include a type of fault information recording processing for recording the fault detected, and wherein the fault management table may include a fault information recording management table for storing the operation mode and the type of fault information recording processing, the operation mode information being related with the type of fault information recording processing.

The type of the fault handling processing may include a type of the fault recovery processing, and wherein the fault management table may include a fault recovery management table for storing the operation mode and the type of fault recovery processing, the operation mode information being related with the type of fault recovery processing.

The fault handling system may further include an operating status input section for inputting the operating status of the information processing system, wherein the fault handling facility may input the operating status being inputted from the operating status input section and determine the operation mode information according to the operating status inputted.

The fault handling system may further include an attached device management facility for detecting an attached device connected with the information processing system, wherein the fault handling facility may determine the operation mode information based on the attached device detected by the attached device management facility.

The operation mode information may include operation mode information indicating the operating status of the information processing system depending on a type of the attached device connected with the information processing system, wherein the type of the fault handling processing may include the type of the fault handling processing depending on the type of the attached device connected with the information processing system, and wherein the fault management table may store the type of the fault handling processing and the operation mode information, the operation mode information being related with the type of the fault handling processing according to the type of the attached device connected with the information processing system.

The fault handling system may further include a system configuration management facility for examining a system configuration of the information processing system to define a type of system configuration and for notifying the fault handling facility of the type of system configuration defined, wherein the fault handling facility may determine the operation mode information based on the type of system configuration notified by the system configuration management facility.

The operation mode information may include operation mode information indicating the operating status of the information processing system depending on the type of system configuration, wherein the type of the fault handling processing may include the type of the fault handling processing corresponding to the type of system configuration, and wherein the fault management table may store the type of the fault handling processing and the operation mode information, the type of the fault handling processing being related with the operation mode information based on the type of system configuration.

The type of system configuration may include one of an installing system configuration and an updating system configuration.

The type of system configuration may include one of a duplex system configuration and a single system configuration.

The system configuration management facility may monitor the operating status of the information processing system in a duplex system, and switch the operation mode to a single system operation in a case that another system in the duplex system is not in execution.

The fault handling facility may determine the operation mode information based on the fault detected in the information processing system by the fault detecting section.

The fault handling facility may detect that the information processing system has been recovered from the fault detected and determine the operation mode based on a detected result.

According to another aspect of the present invention, a fault handling method may include, defining operation mode information indicating an operating status of an information processing system, and a type of fault handling processing corresponding to a fault in the information processing system, storing the operation mode information and the type of fault handling processing defined, the operation mode information being related with the type of fault handling processing, detecting a fault in the information processing system, obtaining an operation mode of the information processing system when the fault is detected, obtaining the type of fault handling processing corresponding to the operation mode information obtained, and handling the fault detected by using the type of fault handling processing obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
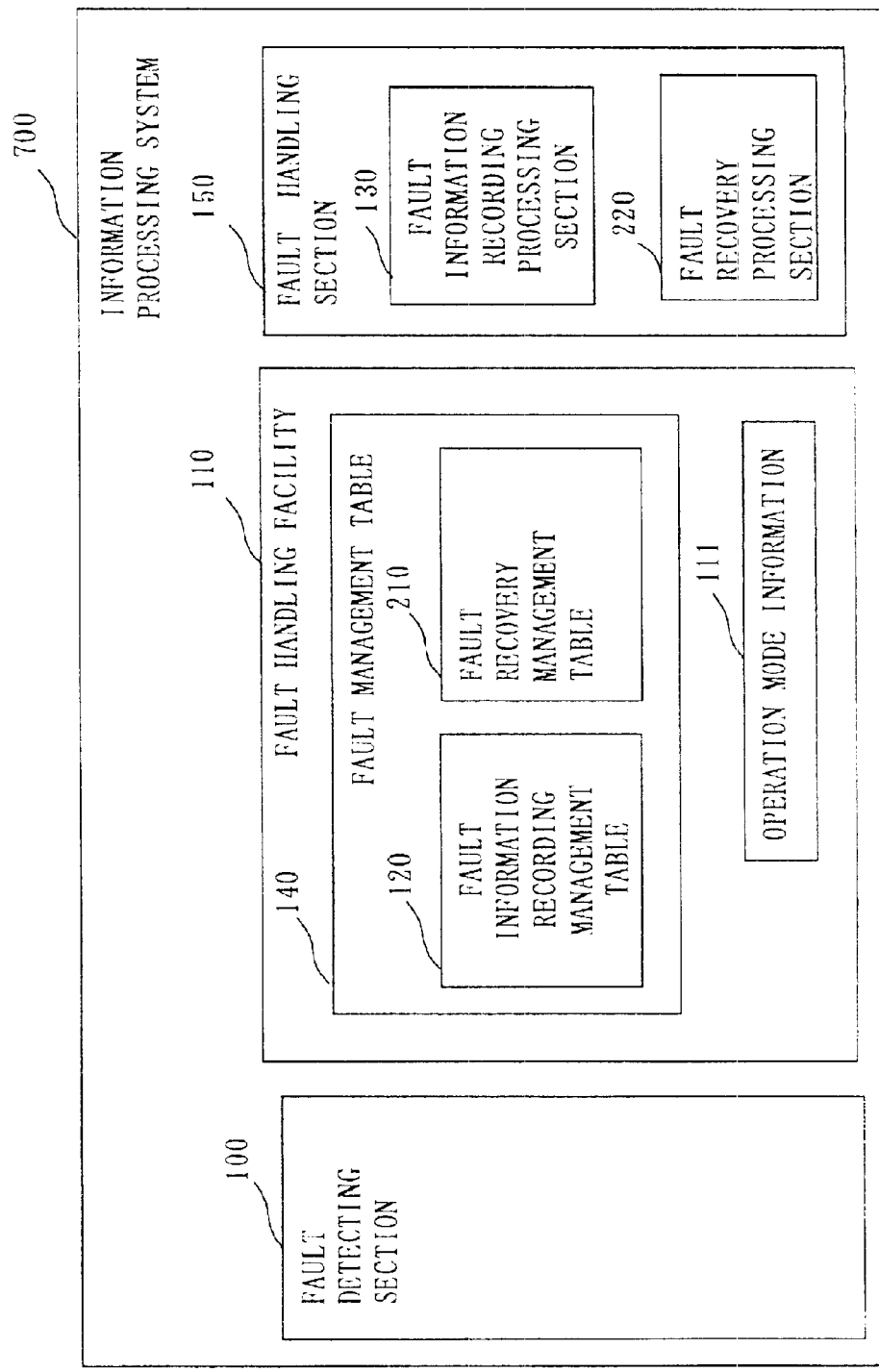
FIG. 1 shows a block diagram illustrating an example of a fault handling system or a fault handling method according to the present invention.

Reference will now be made in detail to the present preferred embodiments of the invention, examples of which are illustrated in the accompanying drawings, wherein like reference numerals indicate like elements through out the several views.

Embodiment 1.

A first embodiment of the present invention discusses a fault handling system for information processing system which is provided with a fault information recording management table within a fault handling facility. The fault handling system of this embodiment is allowed to change the type of fault information recording processing to be used for handling a fault detected, by searching the fault information recording management table for the type of fault information recording processing which is optimal to the fault detected, based on the operation mode information of the information processing system and the fault class information of the detected fault.

FIG. 1 shows a block diagram illustrating a system configuration of the fault handling system or a system based on a fault handling method according to the first embodiment of the present invention.

A reference numeral 700 denotes the information processing system.

A reference numeral 100 denotes a fault detecting section for detecting a fault in the information processing system and for judging and identifying fault information 101 and fault class information 102 indicating the degree of seriousness of the fault.

The fault detecting section 100 is provided with a fault information register for storing the fault information 101 and a fault class information register for storing the fault class information 102, both of which are not shown in FIG. 1.

A reference numeral 110 denotes a fault handling facility which judges and identifies operation mode information 111 indicating an operating status of the information processing system 700. Then the fault handling facility 110 selects a type of fault recovery processing corresponding to the operation mode information 111 judged and identified, and the fault class information 102 judged and identified from among others stored in the fault information recording management table. Then, the fault processing facility 110 controls a selected type of fault recovery processing.

Alternatively, it may be allowed that the fault handling facility 110 selects a type of fault handling processing corresponding to either one of the operation mode information 111 and the fault class information 102.

Specifically, the fault handling facility 110 is provided with an operation mode information register for storing the operation mode information 111 judged and identified, which is not shown in FIG. 1.

A reference numeral 140 denotes a fault management table which stores the operation mode information 111 and the type of fault handling processing for handling the fault in the information processing system. The fault management table stores the operation mode information 111 and the type of fault handling processing in such a manner as to relate them with each other. The fault management table is provided within the fault handling facility 110 in FIG. 1.

The fault management table 140 includes a fault information recording management table 120 and a fault recovery management table 210.

A reference numeral 150 denotes a fault handling section having a module for providing the fault recovery processing. The fault handling section 150 receives a notification of the type of fault handling processing from the fault handling facility 110 and starts a module relating with a notified type of fault handling processing. The module is a unit of computer program for accomplishing such purposes as providing or executing the notified type of fault handling processing.

The fault handling section 150 includes a fault information recording processing section 130 and a fault recovery processing section 220.

An example of the fault handling system of this invention is discussed below in the case that the fault information recording processing is performed for the fault handling processing. Accordingly, in the following descriptions, the fault management table 140 uses the fault information recording management table 120 and the fault handling section 150 uses the fault information recording processing section 130, for example.

The fault handling system and fault handling method of the first embodiment will be discussed in detail with reference to the drawings.

Figure 2:
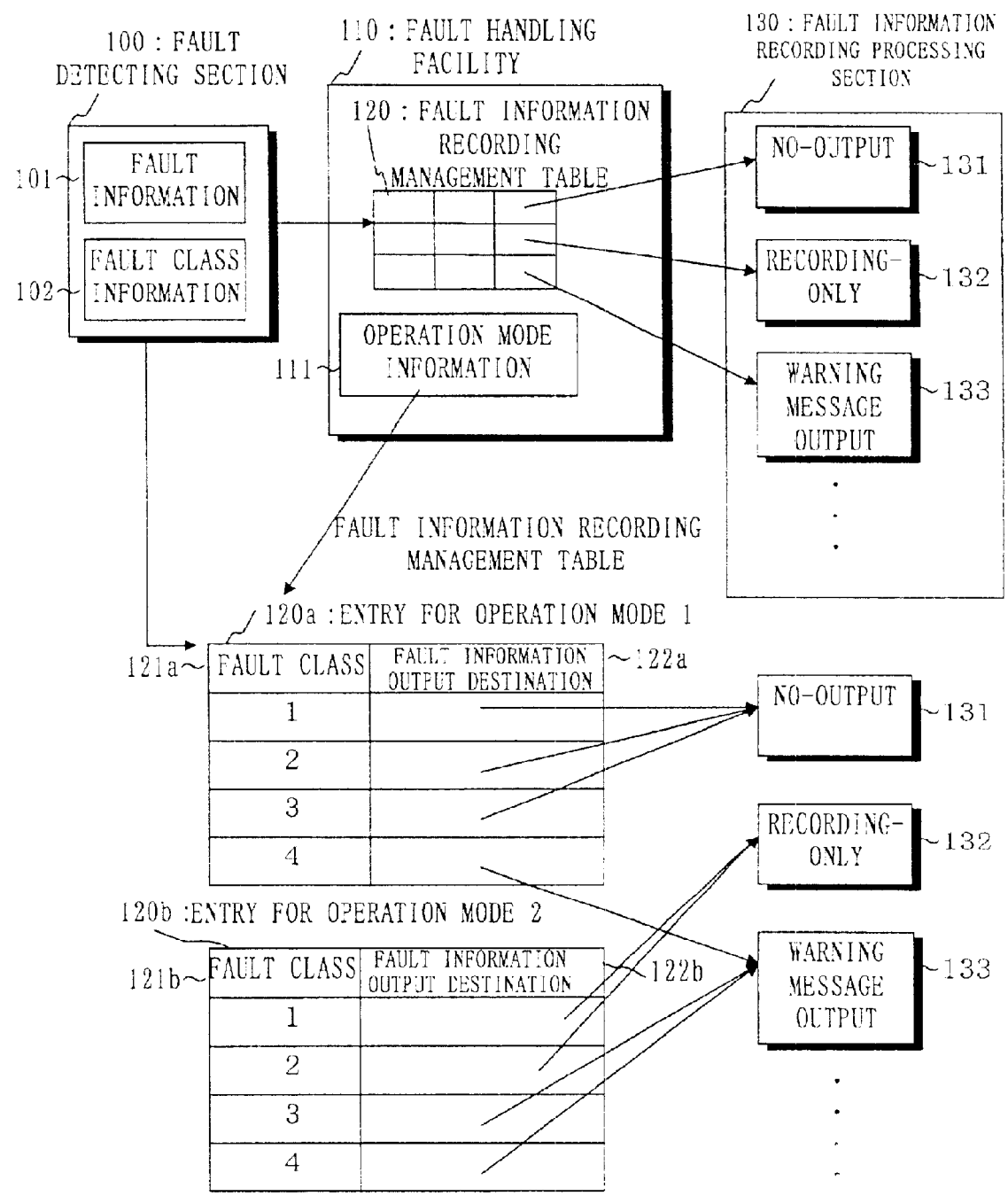
FIG. 2 shows a block diagram illustrating an example of a fault handling system or a fault handling method according to a first embodiment of the present invention.

FIG. 2 shows a block diagram of a fault handling system for information processing system according to the first embodiment of the present invention.

Referring to FIG. 2, elements sharing the reference numerals with the elements of FIG. 1 are assumed to be the same elements as those discussed in the first embodiment.

The fault handling facility 110 is provided with the operation mode information 111 and the fault information recording management table 120. The fault information recording management table 120 is provided with a separate entry for each operation mode. The fault information recording management table 120 is also provided fault class information 121 (fault class 121a, fault class 121b) and a fault information output destination 122 by relating the fault class information with the fault information output destination. The fault information output destination 122 stores the type of fault information recording processing. The fault information recording processing section 130 records the fault information and performs the fault handling processing. The fault information recording processing section 130 is provided with various types of modules such as a module 131, a module 132 and a module 133, which are used, respectively, for providing various types of the fault information recording processing. This embodiment introduces a no-output module 131, a recording-only module 132 and a warning message output module 133 as examples. The types of modules introduced above may not limit the types of modules applicable to the fault handling system according to this embodiment of the present invention.

An operation of the fault handling system of the first embodiment of the present invention is discussed with reference to the flow chart of FIG. 3.

In the case of a fault occurred in a hardware or software of the information processing system during an operation, the fault detecting section 100 starts operating and detects the fault at a step S101. Then, the fault detection section 100 collects the fault information 101 to judge and identify the fault. Based on a judged and identified result, the fault detecting section 100 defines and sets the fault class information 102 of the fault detected. The fault class information 102 indicates how serious the detected fault is or the degree of seriousness of the detected fault. The degree of seriousness may indicate that the detected fault is operation-log like information, a type of fault occurring only temporarily, a type of fault occurring in a continuous manner, or a type of fault causing the system operation to stop. In this embodiment, the fault class information is indicated by a numerical value. The fault class information 102 bearing a numerical value N (N=1, 2, . . . ) will be referred to hereinafter as a "Fault Class N".

Subsequently, the fault information 101 and the fault class information 102 are transferred to the fault handling facility 110. The fault handling facility 110 obtains the operation mode information 111 of the information processing system at a step S102. The operation mode information 111 is a constant which is set by the system administrator and stored in the information processing system. The operation mode information 111 indicates the operating status of the information processing system: the information processing system may be at the development operation phase, at the test verification operation phase, at the maintenance operation phase, or at the substantial operation phase. According to this embodiment, the operation mode information 111 is indicated by a numerical value. The operation mode information 111 bearing a numerical value N (N=1, 2, . . . ) will be referred to hereinafter as an "Operation Mode N".

At a step S103, the fault handling facility 110 searches the fault information recording management table 120 for an optimal entry based on the operation mode information 111 and the fault class information 102. In the case that the operation mode information 111 bears a numerical value 1 (Operation Mode 1), an entry 120a for Operation Mode 1 is used. Then, the fault handling facility 110 specifies the fault class 121a based on the value of the fault class information 102 and determines a fault information output destination 122a. As a result, one of the types of the fault information recording processing which are registered and stored in the fault information output destination 122a is obtained. One or more modules may be selected and called out from the fault information recording processing section 130 to accomplish such purposes as executing the type of the fault information recording processing obtained. Operational steps S104a, S104b, S104c in the flow chart of FIG. 3 include operations based on various types of the modules for accomplishing the execution of the various types of fault handling processing. According to the example of FIG. 2 with Operation Mode 1, the no-output module 131 is called out in the case of a fault judged as of Fault Class 1, Fault Class 2, or Fault Class 3, whereas the warning message output module 133 is called out in the case of a fault judged as of Fault Class 4. On the other hand, with Operation Mode 2, the recording-only module 132 is called out in the case of a fault judged as of Fault Class 1 or Fault Class 2, whereas the warning message output module 133 is called out in the case of a fault judged as of Fault Class 3 or Fault Class 4. Thus, the type of fault information recording processing may be switched adaptively according to the operation mode. Next, at a step S105, the fault handling facility 110 calls out the fault recovery processing section 220. Then, the information processing system can be recovered from the fault condition.

Thus, according to the first embodiment, the fault handling system or the fault handling method for information processing system defines the operation mode information 111 of the information processing system and the fault class information 102 of the detected fault. Furthermore, the fault handling system or the system based on the fault handling method is provided with the fault information recording management table 120 which is used for setting the type of the fault information recording processing adaptively according to the operation mode of the information processing system and the fault class information of the detected fault. This allows the information processing system to change the type of fault information recording processing for fault handling processing by changing the operation mode of the information processing system.

As aforementioned, the fault handling system or the fault handling method according to the first embodiment of the present invention is characterized with the following features in the fault handling processing for information processing system for detecting a fault occurred in a hardware or software of the information processing system, recording the information of the fault and performing the fault recovery processing.

The fault handling system or system based on the fault handling method is provided with the fault detecting section 100 which judges and identifies the type of fault, collects the fault information, and defines the fault class information indicating the degree of seriousness of the detected fault.

The fault handling system or system based on the fault handling method is provided with the fault handling facility 110 which defines the operation mode information indicating the current operating status of the information processing system.

The fault handling system or system based on the fault handling method is provided with the fault information recording processing section 130 which holds modules for providing various means for recording the fault information.

The fault handling system or system based on the fault handling method is provided with the fault information recording management table 120 in the fault handling facility. The fault information recording management table 120 holds the operation mode information, the fault class information, and the modules to be used for the fault information recording processing, in such a manner as to relate them with one another.

The fault handling facility 110 determines a method for recording the fault information based on the operation mode information of the information processing system, the fault class information of a detected fault, and the fault information recording management table.

Thus, the fault handling system of this embodiment of the present invention has the positive effect of selecting the type of fault recovery processing optimal to a fault detected for handling the fault occurred adaptively according to the operation mode information of the information processing system.

Embodiment 2.

A fault handling system of a second embodiment of the present invention modifies the configuration of the fault handling system discussed in the first embodiment by adding a fault recovery management table provided in the fault handling facility. The fault handling system of this embodiment is allowed to change the type of the fault recovery processing optimal to a fault detected, by searching the fault recovery management table for the optimal type of the fault recovery processing based on the operation mode information of the information processing system and the fault class information of the fault detected.

The fault handling system of the second embodiment of the present invention will be discussed in detail with reference to the drawings.

Figure 4:
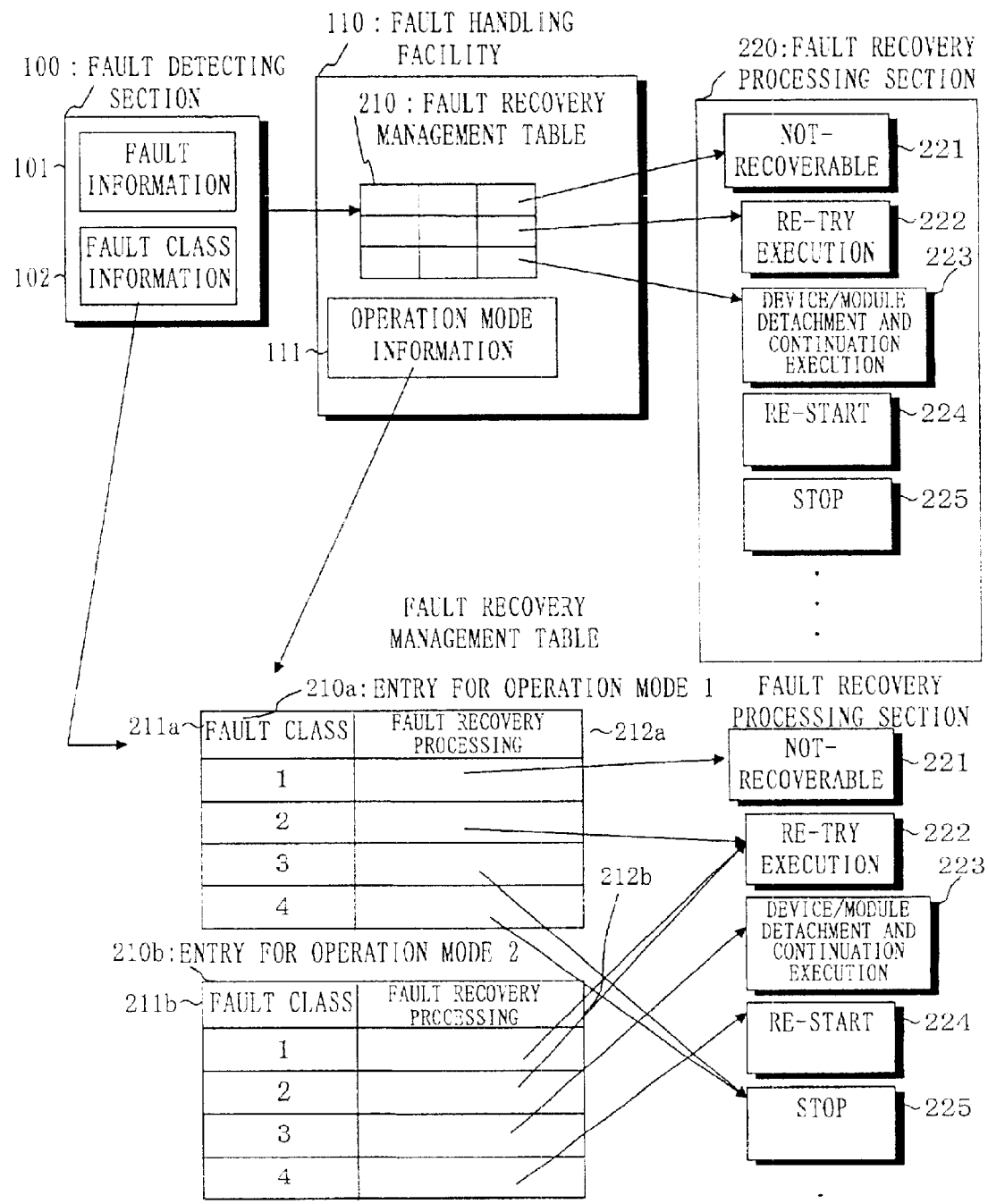
FIG. 4 shows a block diagram illustrating an example of a fault handling system or a fault handling method according to a second embodiment of the present invention.

FIG. 4 shows a block diagram illustrating an example of the fault handling system for information processing system or a system based on a fault handling method according to the second embodiment of the present invention.

Referring to the figure, elements sharing the reference numerals with the elements of FIG. 1 and FIG. 2 are assumed to be the same elements as those discussed in the first embodiment. The fault handling system of the second embodiment includes the fault recovery management table 210, which is added to the configuration of the fault handling facility 110 discussed in the first embodiment. The fault recovery management table 210 is provided with a separate entry for each operation mode. The fault recovery management table 210 holds the fault class information 211 (211a, 211b) and fault recovery processing 212 (212a, 212b) by relating the fault class information with the fault recovery processing. The fault recovery processing section 220 holds various modules for providing various types of fault recovery processing such as a not-recoverable module 221, a re-try execution module 222, a device/module detachment-and-continuation execution module 223, a re-start module 224, and a stop module 225, which are only examples of modules according to this embodiment and do not limit modules applicable to the fault handling system according to the present invention. The fault information recording management table 120 and the fault information recording processing section 130, which are omitted to be shown in FIG. 4, are assumed to be the same elements as those discussed in the first embodiment.

An operation of the fault handling system of the second embodiment of the present invention is now discussed with reference to a flow chart of FIG. 5.

Figure 3:
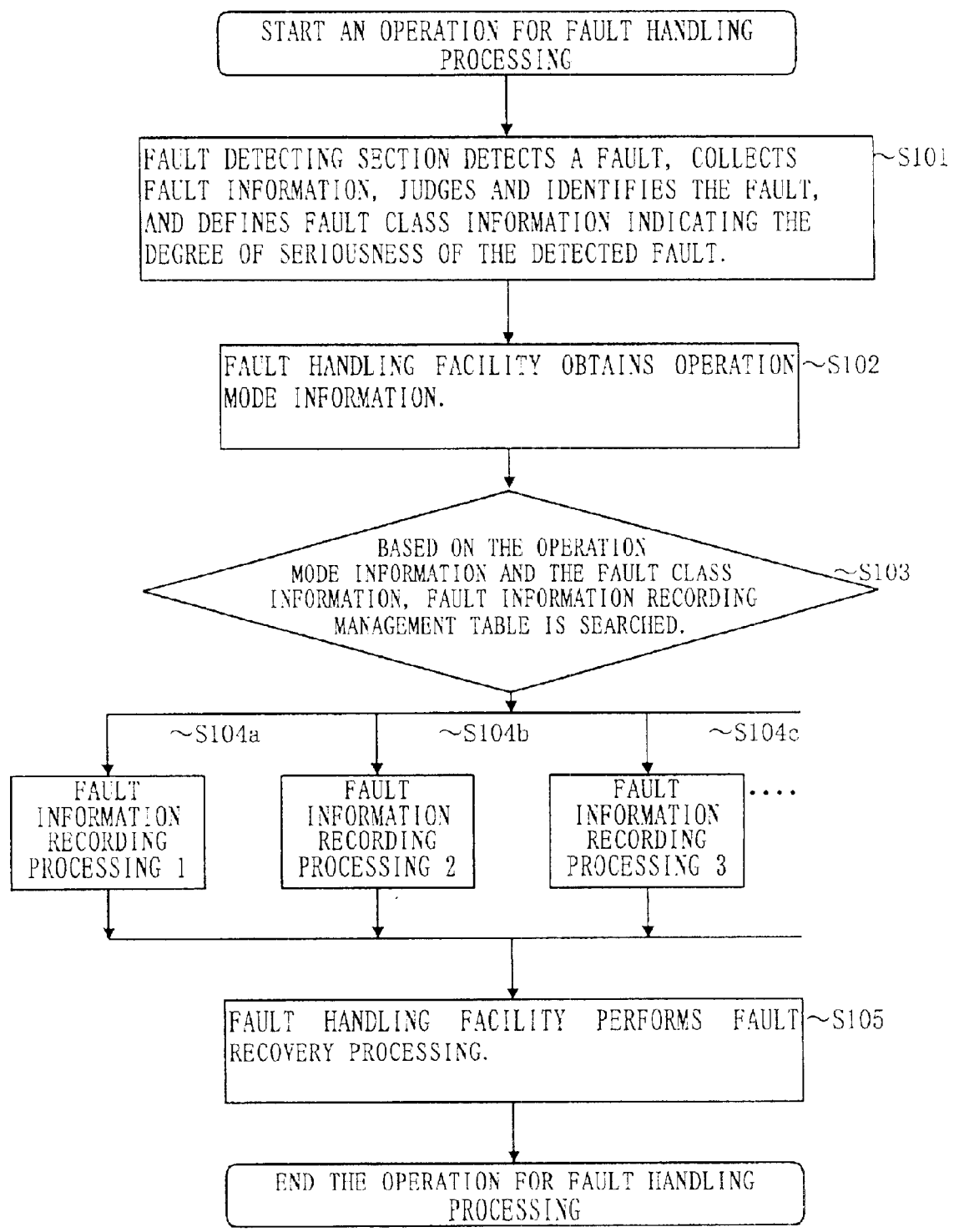
FIG. 3 is a flow chart illustrating an example of the operation of the fault handling system of the first embodiment.
Figure 5:
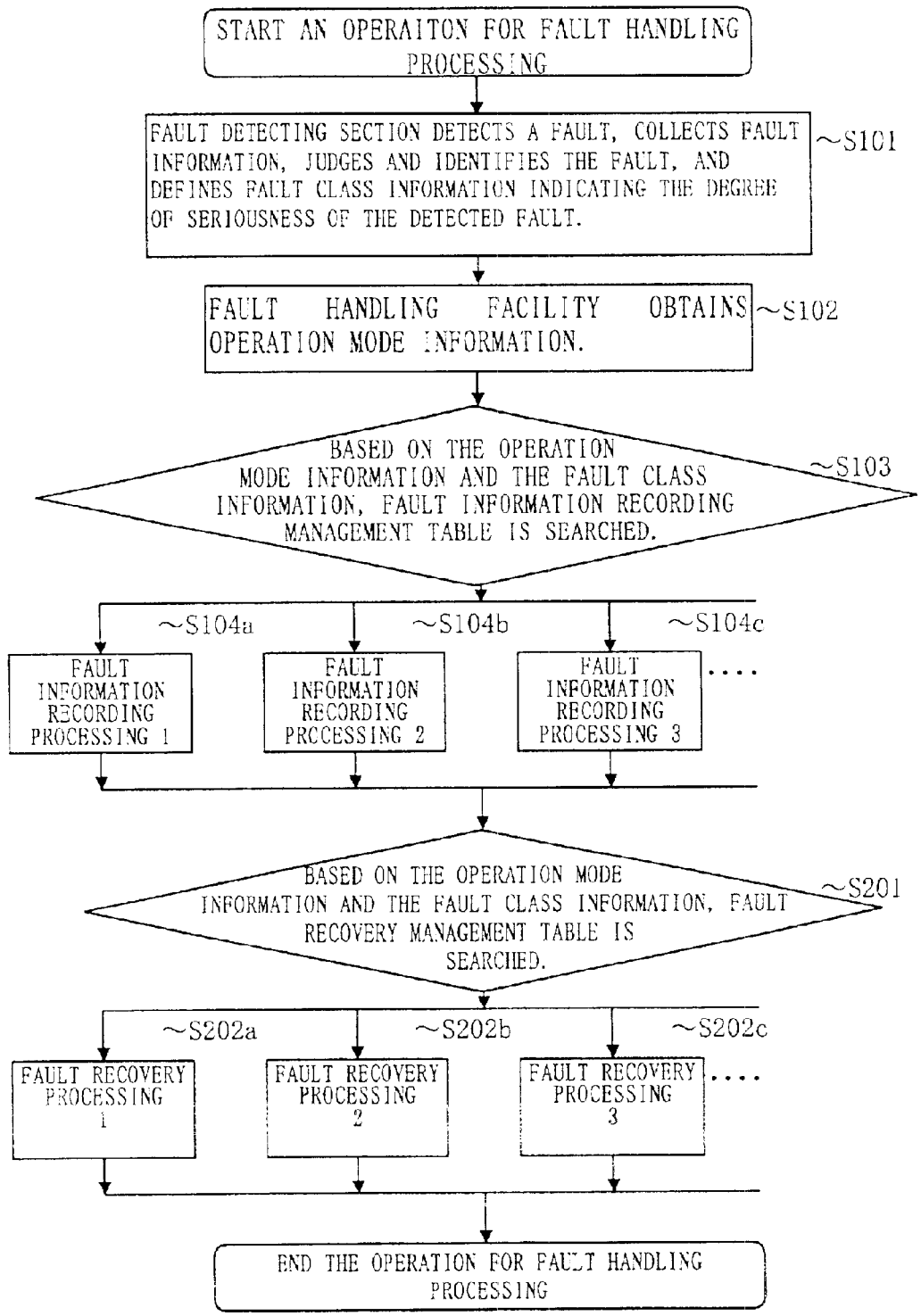
FIG. 5 is a flow chart illustrating an example of the operation of the fault handling system of the second embodiment.

Referring to the flow chart of FIG. 5, steps sharing the reference numerals with the steps shown in the flow chart of FIG. 3 are assumed to be the same steps in operation as those discussed in the first embodiment. According to the second embodiment, when a fault occurred in a hardware or software of the information processing system during an operation, the fault detecting section 100 starts operating at the step S101 to detect the fault, collect the fault information, and determine and identify the detected fault in the same manner as that discussed in the first embodiment. Based on a determined and identified result, the fault class information 102 of the detected fault is set. Then, at the step S102, the fault handling facility 110 obtains the operation mode information 111 of the information processing system. Next, at the step S103, the fault handling facility 110 searches the fault information recording management table 120 for one or more optimal types of the fault information recording processing registered in the table of the fault information output destination based on the operation information 111 and the fault class information 102. The fault handling facility 110 then obtains one or more optimal modules for providing the one or more optimal types of the fault information recording processing searched which are stored in the fault information recording processing section 130. As a result, one of the operational steps S104a, S104b, S104c, . . . in the flow chart of FIG. 3 include operations based on the various types of modules for accomplishing the execution of the various types of the fault information recording processing is selected to call out the one or more modules in the same manner as that described in the first embodiment.

Specifically, with the second embodiment, the fault handling facility 110 further searches the fault recovery management table 210 after the step, S104a, S104b, S104c, . . . for one or more optimal types of the fault recovery processing registered in the table of the fault recovery processing based on the operation information 111 and the fault class information 102. Then, the fault handling facility 110 obtains one or more modules for providing the one or more optimal types of the fault recovery processing searched which are stored in the fault recovery processing section 220. As a result, one of the types of the fault recovery processing indicated by operating steps S202a, S202b, S202c, . . . in the flow chart of FIG. 5 is selected to call out the one or more modules obtained. According to the example of FIG. 4, in the case of Operation Mode 1, the not-recoverable module 221 is called out for a fault of Fault Class 1, the re-try execute module 222 is called out for a fault of Fault Class 2, and the stop module 225 is called out for a fault of Fault Class 3 or Fault Class 4, for example. With Operation Mode 2, on the other hand, the re-try execution module 222 is called out for a fault of Fault Class 1 or Fault Class 2, the device/module detachment-and-continuation execution module 223 is called out for a fault of Fault Class 3, and the re-start execution module 224 is called out for a fault of Fault Class 4, for example. In such a manner according to the operation mode, the type of the fault recovery processing to be used for handling the detected fault may be changed adaptively.

According to the example discussed with reference to FIG. 4 and FIG. 5, the fault handling system is provide with the fault information recording management table 120 and the fault information recording processing section 130, which may not be necessary. Alternatively, the fault information recording management table 120 and the fault information recording processing section 130 may not be provided. In that case, the fault handling system may use the fault recovery management table 210 and the fault recovery processing section 220, instead, for performing the operations illustrated in the flow chart of FIG. 5, excepting the operations at the steps of S103 and S104x (x=1, 2, 3, . . . ).

According to the second embodiment, the fault handling system for information processing system defines the operation mode information 111 and the fault class information 102. The fault handling system is provided with the fault recovery management table to be used for setting the type of the fault recovery processing based on the fault class and the operation mode of the information processing system. For that reason, the fault handling system of this embodiment is allowed not only to change the type of the fault information recording processing for fault handling processing but also to change the type of the fault recovery processing by changing the operation mode of the information processing system.

Thus, the fault handling system of this embodiment is characterized with the following features in addition to those of the fault handling system for information processing system discussed in the first embodiment.

The fault handling system is provided with the fault recovery processing section 220 which holds the modules for accomplishing the execution of the various types of fault recovery processing.

The fault handling system is provided with the fault recovery management table 210 in the fault handling facility 110. The fault recovery management table 210 holds the operation mode information of the information processing system, the fault class information, and the various types of fault recovery processing as the modules in such a manner as to relate them with one another.

The fault handling system 110 determines the type of the fault recovery processing to be used for fault handling processing, by searching the fault recovery management table 210 for the type of the fault recovery processing to be used based on the operation mode information of the information processing system and the fault class information of the detected fault.

Thus, the fault handling system of this embodiment has the positive effect of changing the type of the fault recovery processing to be used adaptively according to the operation mode information of the information processing system and the fault class information of the detected fault.

Embodiment 3.

A fault handling system of a third embodiment of the present invention modifies the fault handling system discussed in the second embodiment by adding a function of setting the operation mode information of the information processing system by means of an operation mode switch provided on a console panel. The fault handling system of this embodiment is allowed to change the type of the fault handling processing to be used adaptively through a switching operation by the operation mode switch on the console panel.

The fault handling system according to the third embodiment of the present invention will be discussed in detail with reference to the drawings.

Figure 6:
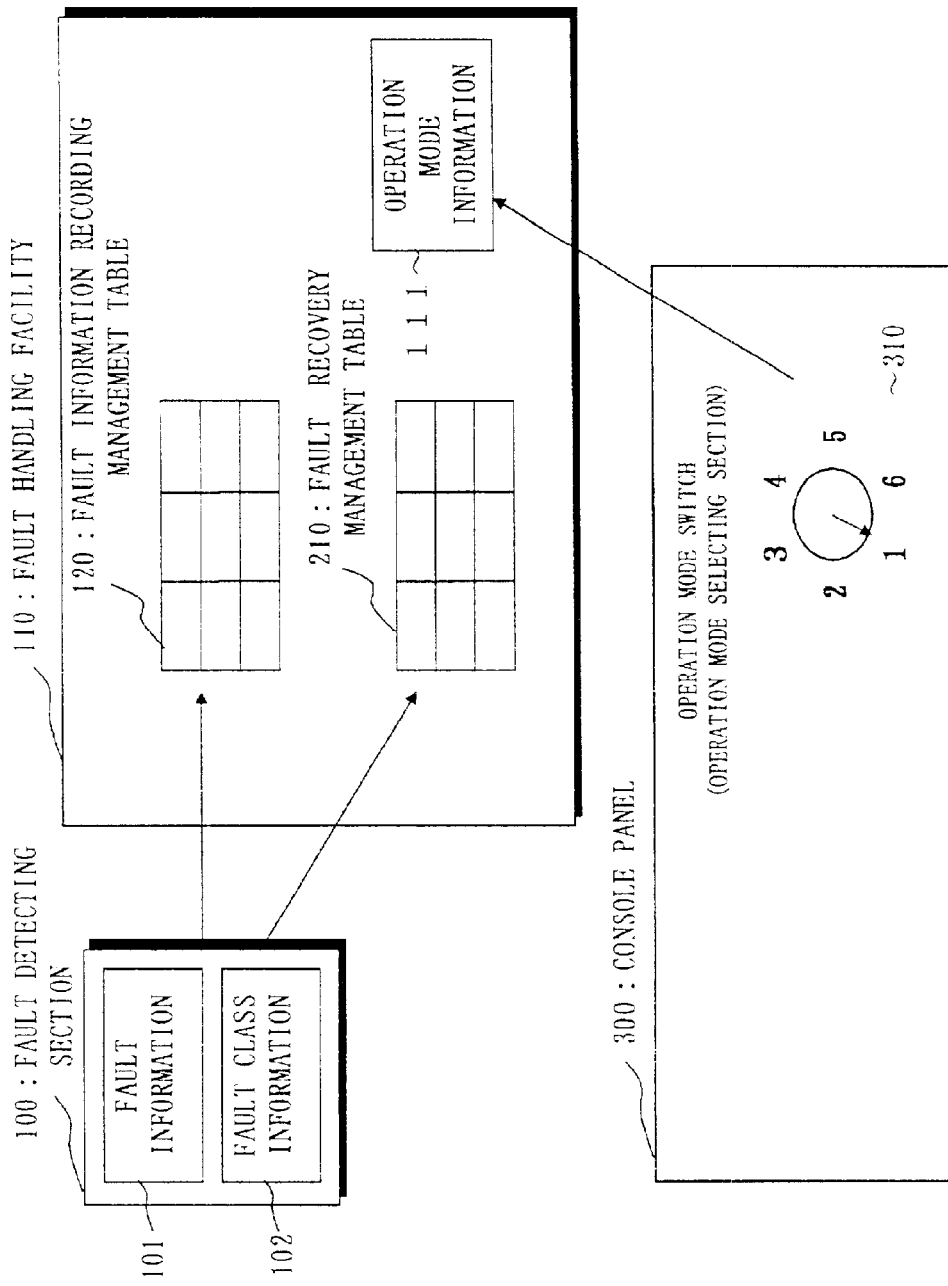
FIG. 6 shows a block diagram illustrating an example of a fault handling system or a fault handling method according to a third embodiment of the present invention.

FIG. 6 shows a block diagram of the fault handling system for information processing system according to the third embodiment of the present invention.

Referring to the figure, elements sharing the reference numerals with the elements of FIG. 1, FIG. 2, and FIG. 4 are assumed to be the same elements as those discussed in the first and second embodiments. The fault handling system of the third embodiment is provided with an operation mode switch 310, which is added to the configuration of the fault handling system discussed in second embodiment, as an operation mode selecting section provided on a console panel 300 for controlling the information processing system. The operation mode switch 310 selects an operation mode by specifying (designating) a numerical value assigned to the operation mode.

The operation mode information 111, which is only referred to in the second embodiment, can be set manually according to the third embodiment by means of the operation mode switch 310 provided on the console panel. Specifically, a value specified by the operation mode switch 310 is referred to as the operation mode information 111. The fault handling facility 110 sets or updates the operation mode information by referring to an operation mode specified by the operation mode switch 310. In the case that an operation is performed according to the flow chart of FIG. 5 discussed in the second embodiment based on the operation mode information 111, the type of the fault information recording processing and the type of the fault recovery processing for fault handling processing may be changed by changing the operation mode by means of the operation mode switch on the console panel.

In the descriptions above, the operation mode switch 310 is added to the configuration of the fault handling system discussed in the second embodiment as an example. Alternatively, however, the operation mode switch 310 may be added to the configuration of the fault handling system discussed in the first embodiment. In that case, the operation may be performed according to the flow chart of FIG. 3.

Furthermore, the fault handling system of this embodiment may not be limited to the descriptions above having the operation mode switch 310 for entering a numerical value assigned to a specific operation mode. Alternatively, the numerical value may be entered by the system administrator of the information processing system by means of any input device such as a keyboard, a mouse, or a stick, depending on the input screen.

Thus, according to the third embodiment, the fault handling system for information processing system is provided with the operation mode switch on the console panel of the information processing system for changing the fault handling processing. This allows the system administrator or system operator of the information processing system to change the type of fault handling processing easily and adaptively in response to a change in the operating status of the information processing system.

Thus, the fault handling system for the information processing system of this embodiment is characterized with the following features in addition to those of the fault handling system for information processing system discussed in the second embodiment.

The fault handling system is provided with the operation mode switch for changing the operation mode information while the information processing system is in operation.

The fault handling facility 110 changes the type of the fault information recording processing and the type of the fault recovery processing in response to a change in the operation mode information while the information processing system is in operation.

Thus, the fault handling system of this embodiment has the positive effect of selecting the type of the fault information recording processing to be used and the type of the fault recovery processing to be used for fault handling processing adaptively according to the operation mode information of the information processing system.

Furthermore, the fault handling system of this embodiment has the positive effect of allowing the system administrator to enter and change the operating status of the information processing system easily.

Embodiment 4.

A fault handling system of a fourth embodiment of the present invention has a new function added to the functions of the fault handling system discussed in the second embodiment of the present invention. The fault handling system of this embodiment is provided with a function of detecting the connection status of the information processing system with individual I/O (Input/Output) devices such as a console and a hard disk, and changing the operation mode information automatically based on a detected result. The type of fault handling processing to be used may be changed automatically and adaptively according to the system configuration of the information processing system connected with I/O devices.

The fault handling system of the fourth embodiment of the present invention will be discussed below with reference to the drawings.

Figure 7:
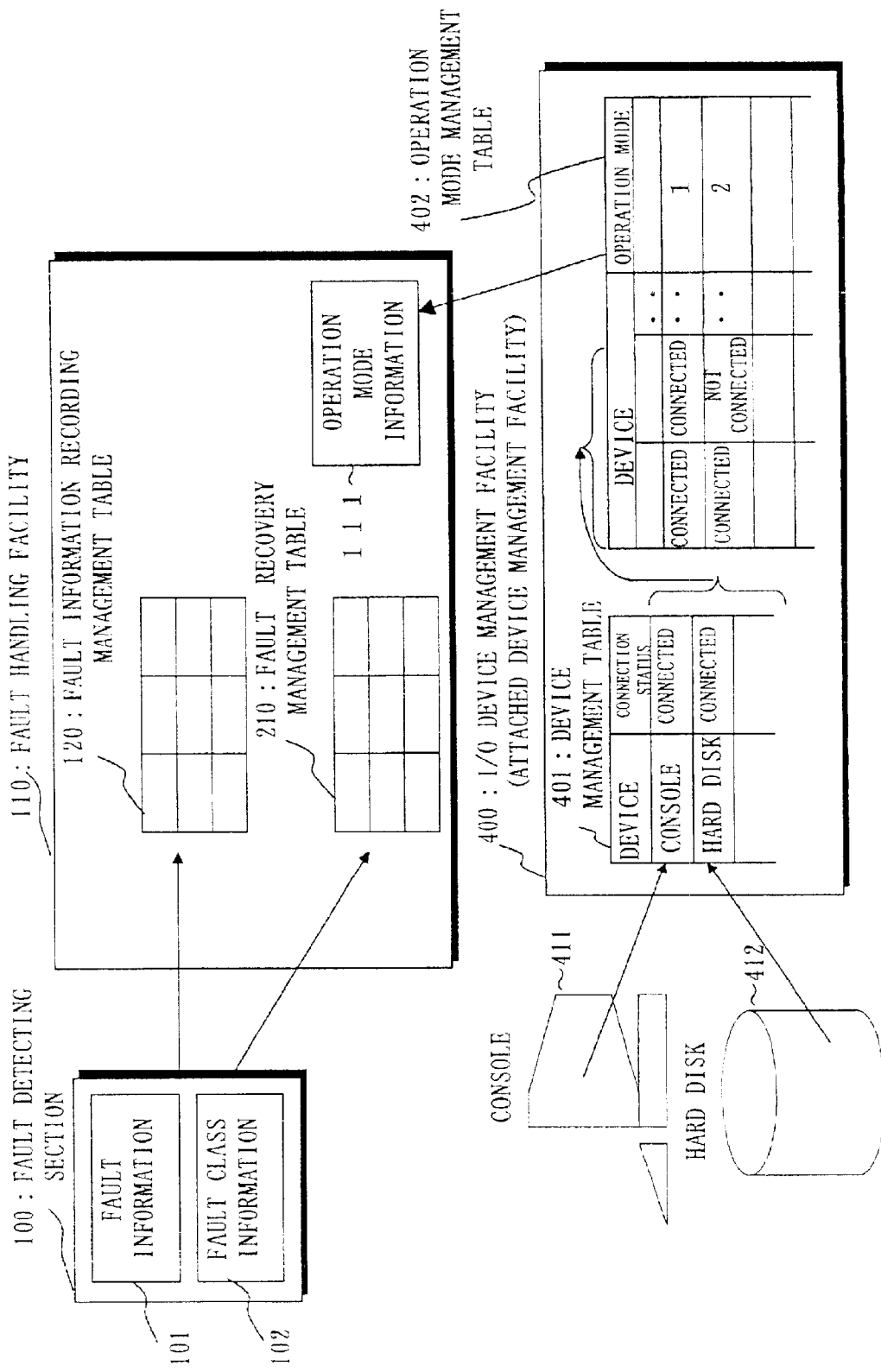
FIG. 7 shows a block diagram illustrating an example of a fault handling system or a fault handling method according to a fourth embodiment of the present invention.

FIG. 7 shows a block diagram of a fault handling system for information processing system according to the fourth embodiment of the present invention.

Referring to the figure, elements sharing the reference numerals with the elements of FIG. 1, FIG. 2, and FIG. 4 are assumed to be the same elements as those discussed in the first and second embodiments. The fault handling system of the fourth embodiment is provided with an I/O device management facility 400 as an attached device management facility in addition to the configuration of the fault handling system discussed in the second embodiment. The I/O device management facility 400 includes a device management table 401 and an operation mode management table 402. The device management table 401 holds devices (attached devices) of different types and the corresponding connection status, connected or not connected, of the individual devices with the information processing system. The operation mode management table 402 shows the operation mode according to the connection status of the respective devices. A console 411 or a hard disk 412, which is a device to be connected with the information processing system, is connected with the information processing system in some cases, and detached in other cases according to the operating status of the information processing system. For that reason, the I/O device management facility 400 is used for detecting the connection status of the individual devices with the information processing system.

Those devices (attached devices) to be connected with the information processing system may not be limited to the console and hard disk introduced above. Alternatively, any device which can output the fault information such as a printer and the diskette of a recording medium (a flexible disk, a magnetic tape, a magnetic disc, a CD-ROM (Compact Disc Read Only Memory), an optical disk, etc.) may be applicable to the fault handling system of this embodiment as the devices to be connected with the information processing system.

The operation mode information 111 of this embodiment includes a plurality of types of operation modes, each indicating a different operating status of the information processing system according to a different type of the attached devices connected with the information processing system. The fault handling processing (the fault information recording processing, the fault recovery processing) includes a plurality of types of the fault handling processing, each provided for the different type of the attached devices to be used by the fault handling processing.

Furthermore, the fault management table 140 stores the fault handling processing and the operation mode information 111 in such a manner as to relate the fault handling processing with the operation mode information according to the attached device to be used for fault handling processing.

Figure 8:
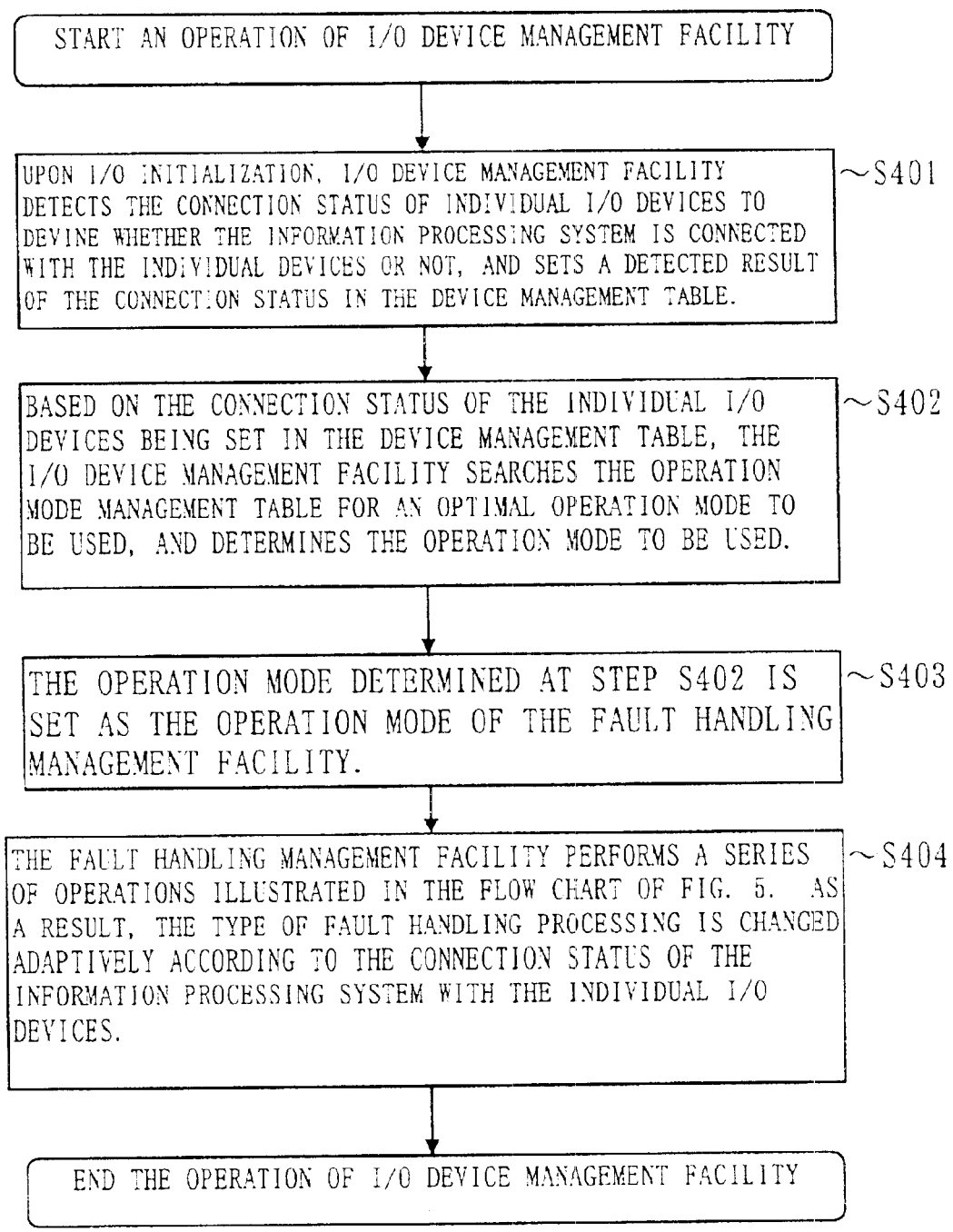
FIG. 8 is a flow chart illustrating an example of the operation of the fault handling system of the fourth embodiment.

An operation of the fault handling system according to the fourth embodiment of the present invention will be discussed with reference to a flow chart of FIG. 8.

According to the fourth embodiment, the I/O device management facility 400 initializes a device connected with the information processing system. Specifically, the I/O device management facility 400 detects the connection status of the information processing system with individual I/O devices to determine whether the information processing system is connected with the individual I/O devices or not in a step S401. In the case that an I/O device is connected with the information processing system, the I/O device management facility 400 sets a connection status, "connected", in the entry of the I/O device in the device management table 401. In the case that the I/O device is not connected with the information processing system, then the I/O device management facility 400 sets a connection status, "not-connected", in the entry. Upon completion of the initialization of all the I/O devices listed in the table, the I/O device management facility 400 searches the operation mode management table 402 for an optimal operation mode based on the connection status of the device indicated in the device management table 401 in a step S402. Then, the optimal operation mode indicated in the corresponding entry is selected to be used.

In a step S403, the I/O device management facility 400 sets the selected operation mode as the operation mode of the fault handling facility 110. Subsequently, the fault handling facility 110 performs a series of the same operations as those discussed with reference to the flow chart of FIG. 5 in the second embodiment. As a result, the operation mode can be changed adaptively according to the connection status of the device, thereby allowing the fault handling processing to be changed adaptively. A series of operations illustrated in a flow chart of FIG. 8 may be performed not only at the time of initializing the information processing system but also at the time of notifying of an event caused by interruption, or in a periodic cycle while the information processing system is in operation. Further, as a result, if the system configuration changes with the change of the attached device while the system is in operation, the type of the fault handling processing is changed correspondingly.

The fault handling system for information processing system according to the fourth embodiment thus changes the operation mode, the type of the fault information recording processing and the type of the fault recovery processing according to the I/O device connected or not connected with the information processing system. As a result, the type of fault handling processing is allowed to be changed easily and adaptively according to a change in the system configuration based on the operating status of the information processing system.

As aforementioned, the fault handling system of this embodiment is characterized with the following features in addition to those of the fault handling system for information processing system discussed in the second embodiment.

The fault handling system is provided with the I/O device management facility 400 for detecting the connection status of the information processing system with the individual I/O devices such as a console terminal and a hard disk.

The fault handling system refers to the I/O device connection information which is held by the I/O device management facility. In the case that a specific I/O device to be used for a specific type of the fault information recording processing or a specific type of the fault recovery processing is not connected with the information processing system, then the fault handling system switches the operation mode information automatically to the type of the operation mode information corresponding to the operation mode in which the specific I/O device is not used for fault handling processing.

Thus, the fault handling system of this embodiment has the positive effect of changing the fault handling processing adaptively according to the connection status of the information processing system with the individual I/O devices.

Embodiment 5.

A fault handling system according to a fifth embodiment of the present invention has a new function added to the function of the fault handling system according to the second embodiment. The fault handling system of this embodiment is provided with a function of detecting a change in the system configuration when a new system is installed or the existing system is updated, and changing the operation mode information automatically and adaptively according to a detected result. As a result, the type of fault handling processing may be automatically switched to a special type of fault handling processing applicable to the situation susceptible to fault when a system is newly installed or the system is updated.

Figure 9:
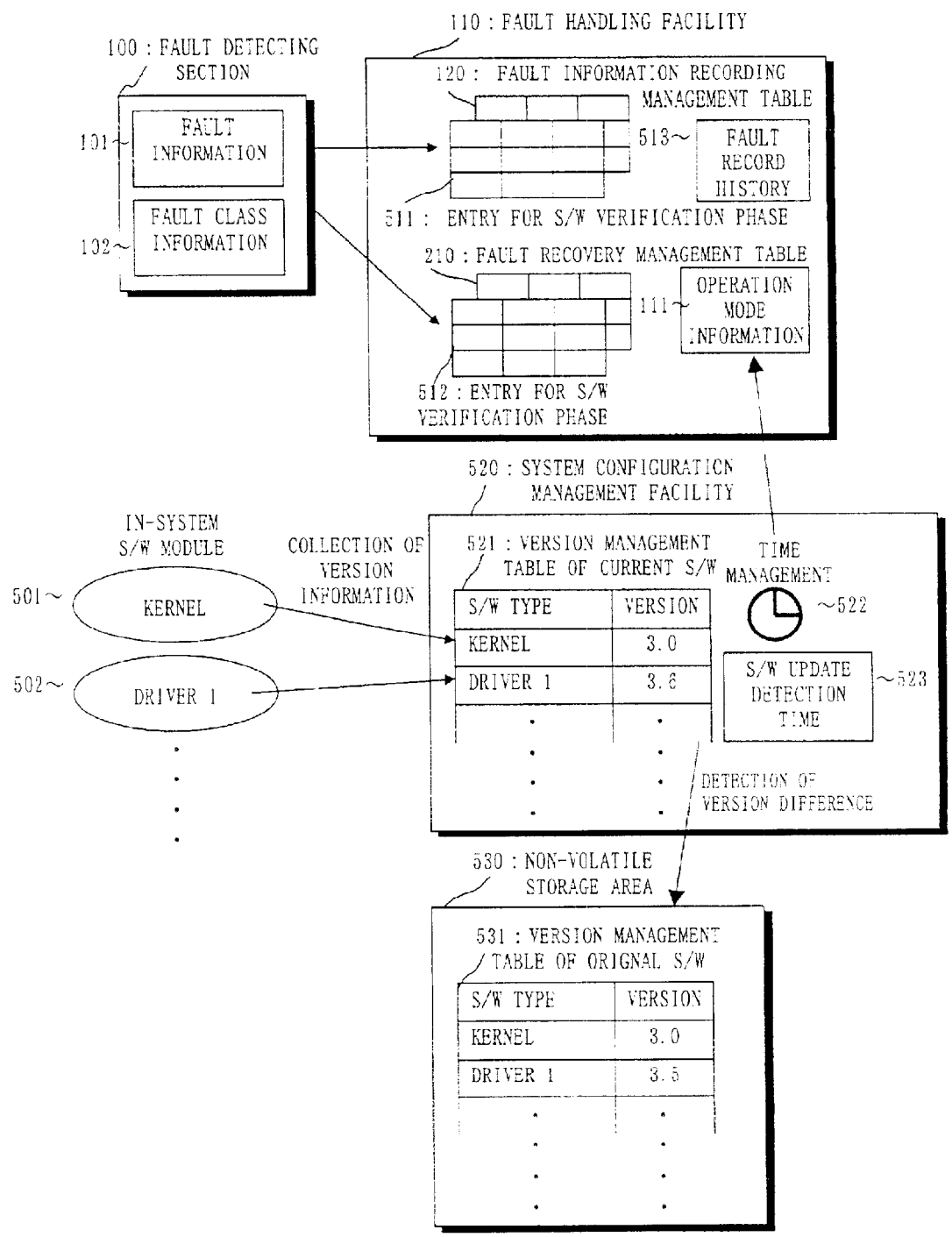
FIG. 9 shows a block diagram illustrating an example of a fault handling system or a fault handling method according to a fifth embodiment of the present invention.

The fault handling system of the fifth embodiment of the present invention will be discussed below with reference to the drawings FIG. 9 shows a block diagram of the fault handling system for information processing system according to the fifth embodiment of the present invention.

Referring to the figure, elements sharing the reference numerals with the elements of FIG. 1, FIG. 2, and FIG. 4 are assumed to be the same elements as those discussed in the first and second embodiments. The fault handling facility 110 is provided with a fault record history 513 which stores the record of previous faults occurred in the information processing system. The fault information recording management table 120 includes an entry 511 for software (S/W) verification phase, and the fault recovery management table 210 includes an entry 512 for software (S/W) verification phase. Each of the entries 511, 512 corresponds to a special operation mode after updating the software (S/W).

The entry 511 for S/W verification phase has the same configuration as that of the fault information recording management table 120. The entry 511 for S/W verification phase may be included in the fault information recording management table 120 or may be of a separate table.

The entry 512 for S/W verification phase has the same configuration as that of the fault recovery management table 210. The entry 512 for S/W verification phase may be included in the fault recovery management table 120 or may be of a separate table.

The fault handling system of the fifth embodiment modifies the fault handling system discussed in the second embodiment by adding a system configuration management facility 520. The system configuration management facility 520 detects a system configuration status of the information processing system. According to this embodiment, it is assumed that the system configuration management facility 520 detects the version of a software (as a system component) as the system configuration status.

The system configuration management facility 520 is provided with a version management table of current S/W 521 and a software (S/W) update detection time 523. The version management table of current S/W 521 stores the version information of software modules provided in the information processing system. For example, the version management table of current S/W 521 collects and records version information about a kernel 501, a driver 502, and the like.

The time management holds current time information. The S/W update detection time 523 holds the time of detecting a software module being updated in the version management table of current S/W 521. A non-volatile storage area 530 in the information processing system includes a version management table of original software (S/W) 531 which stores the version information of a software module used in the previous execution. The entry of the version management table of original S/W 531 and the entry of the version management table of current S/W 521 correspond to each other.

The operation mode information 111 includes different types of the operation mode indicating different types of the operating status of the information processing system depending on different types of the system configuration status. The fault handling processing (fault information recording processing, fault recovery processing) includes a plurality of types of the fault handling processing corresponding to the different types of the system configuration status.

Furthermore, the fault management table 140 stores the fault handling processing and the operation mode information 111 by relating the fault handling processing with the operation mode information based on the system configuration status.

Figure 10:
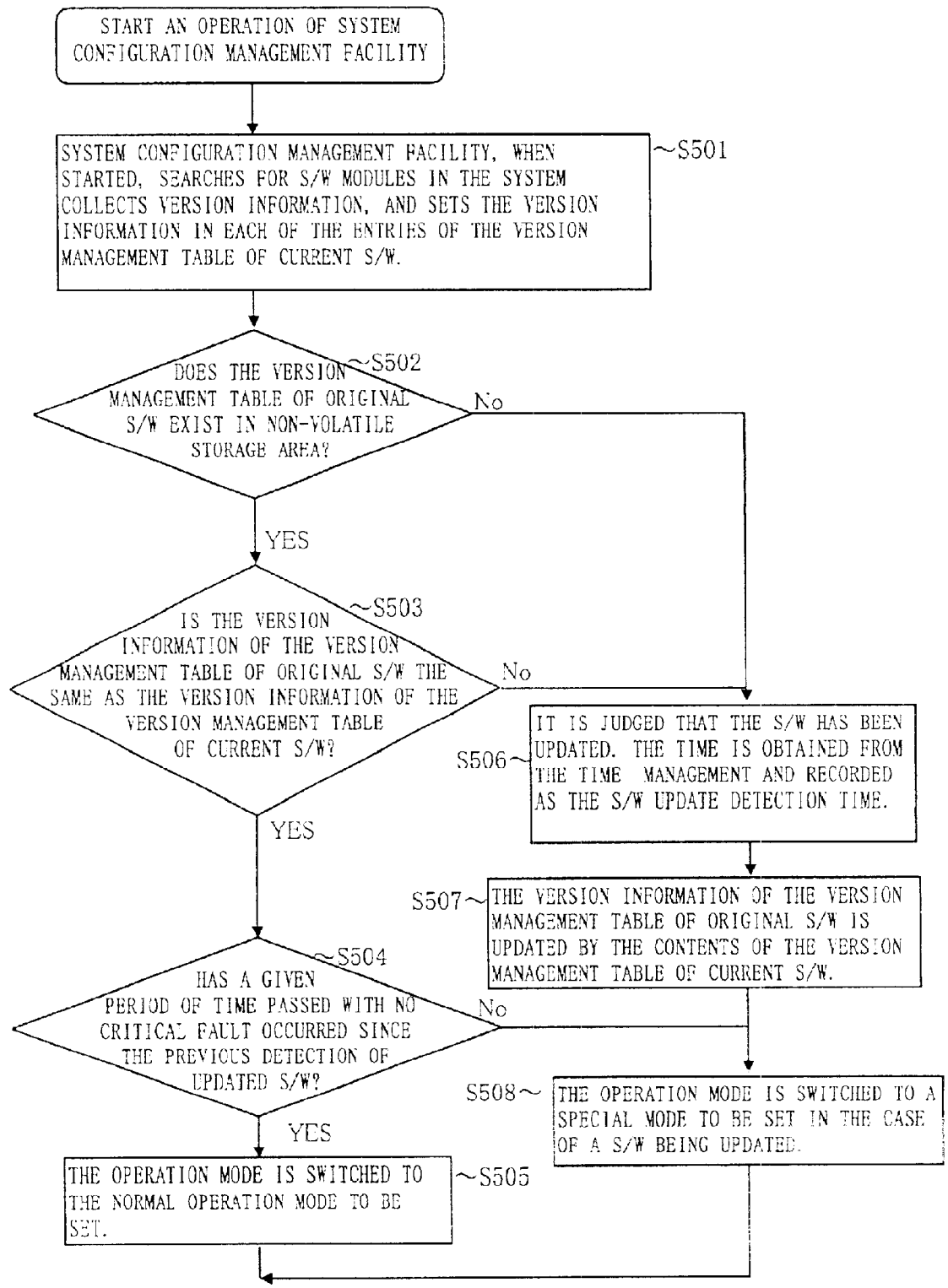
FIG. 10 is a flow chart illustrating an example of the operation of the fault handling system of the fifth embodiment.

An operation of the fault handling system of the fifth embodiment of the present invention will be discussed with reference to a flow chart of FIG. 10.

According to the fifth embodiment, the system configuration management facility 520 starts operating when the information processing system is activated. At a step S501, the system configuration management facility 520 searches for the software modules provided in the information processing system to collect the version information of the individual software modules. The system configuration management facility 520 then sets this version information in each of the entries of the version management table for current S/W 521. At a next step S502, the system configuration management facility 520 examines whether the version management table of original S/W 531 is created in the non-volatile storage area 530 or not. In the case that the version management table of original S/W 531 has not been created, then the system configuration management facility 520 determines that the software is newly installed and performs an operation provided in the case of the existing software being updated at a step S506. In the case that the version management table of original S/W 531 has been created in the non-volatile storage area 530, the system configuration management facility 520 compares the version information of the individual entries in the version management table of original S/W 531 with the version information of the individual entries in the version management table of current S/W 521 at a step S503 to confirm whether the corresponding pairs of the software versions of the individual entries of the version management tables 531 and 521 match or not. If a single pair of corresponding software versions does not match, the operation proceeds to the step S506 to perform the operation after updating software.

When it is confirmed that all the pairs of corresponding software versions match, the system configuration management facility 520 compares at a step S504 the current time obtained from the time management with the software update detection time 523 by referring to the software update detection time 523 and the fault record history 513 to confirm whether a critical fault has occurred at least for a given period of time since the software was updated or not, thereby determining the operation mode. In the case of a critical fault occurred, then the operation mode is set at a step S508. In the case of no critical fault occurred at least for the given period of time, it is judged that the system operation is or will be stable, and the operation mode is switched to the normal operation mode at a step S505. At the step S506 for operation after updating software, the time of detecting the software being updated is recorded in the software update detection time 523.

At a next step S507, the version management table 531 of original S/W 531 in the non-volatile storage area 530 is updated by the contents of the version management table of current S/W 521. Then, at the step S508, the operation mode is switched to a special operation mode for operation after updating software in which the fault information is recorded in detail is determined. Then, at the steps S505 and S508, the operation mode determined is set as the operation mode information 111 in the fault handling facility. Based on the operation mode information 111, either one of the entry 511 for S/W verification phase in the fault information recording management table 120 and the entry 512 for S/W verification phase in the fault recovery management table 210 is selected. In that manner, the type of fault handling processing to be used is changed.

Thus, according to the fault handling system for information processing system of the fifth embodiment, the type of the fault information recording processing and the type of the fault recovery processing are allowed to be changed adaptively by changing the operation mode in response to a software module being updated in the information processing system. As a result, when the system operation is unstable due to a software being updated, a special type of fault handling processing which is different from the type of fault handling processing performed in the normal system operation may be performed. Furthermore, in the case of no critical fault occurred at least for the given period of time since the previous updating of software, it is judged that the system operation is and will be stable, and the operation mode may be switched automatically back to the normal operation mode.

As aforementioned, the fault handling system for information processing system of this embodiment is characterized with the following features in addition to those of the fault handling system for information processing system discussed in the second embodiment.

The fault handling system is provided with the system configuration management facility 520 which detects a system newly installed and the existing system being updated, for example.

The fault handling system is further provided with the operation mode after installation of new system, in which the fault information is recorded in detail and the special type of fault recovery processing is performed after the installation of a new system or the existing system being update. The fault handling system is further provided with the entries of the fault information recording management table 120 and the fault recovery management table 210 holding information set for the operation mode after installation of new system.

The system configuration management facility 520, when detecting a system newly installed or the existing system being updated, switches the operation mode information automatically to the operation mode after installation of new system.

The fault handling facility 110, when detecting a stable system operation for the given period of time since the previous detection of the existing system being updated, changes the operation mode information automatically and switches the operation mode to the normal operation mode in which a detected fault is handled with the type of fault handling processing performed in the normal system operation.

Thus, the fault handling system of this embodiment has the positive effect of changing the type of fault handling processing adaptively according to the system configuration of the information processing system.

Embodiment 6.

A fault handling system according to a sixth embodiment of the present invention has a new function added to the function of the fault handling system discussed in the second embodiment. The fault handling system of this embodiment is provided with a function of detecting the occurrence of a critical fault in the information processing system, and changing the operation mode information automatically based on a detected result. As a result, when the system operation is unstable after detecting a fault in the information processing system, the type of fault handling processing can be switched automatically and adaptively to a special type of fault handling processing designed for handling a fault in that situation.

The fault handling system of the sixth embodiment of the present invention will be discussed below with reference to the drawings.

Figure 11:
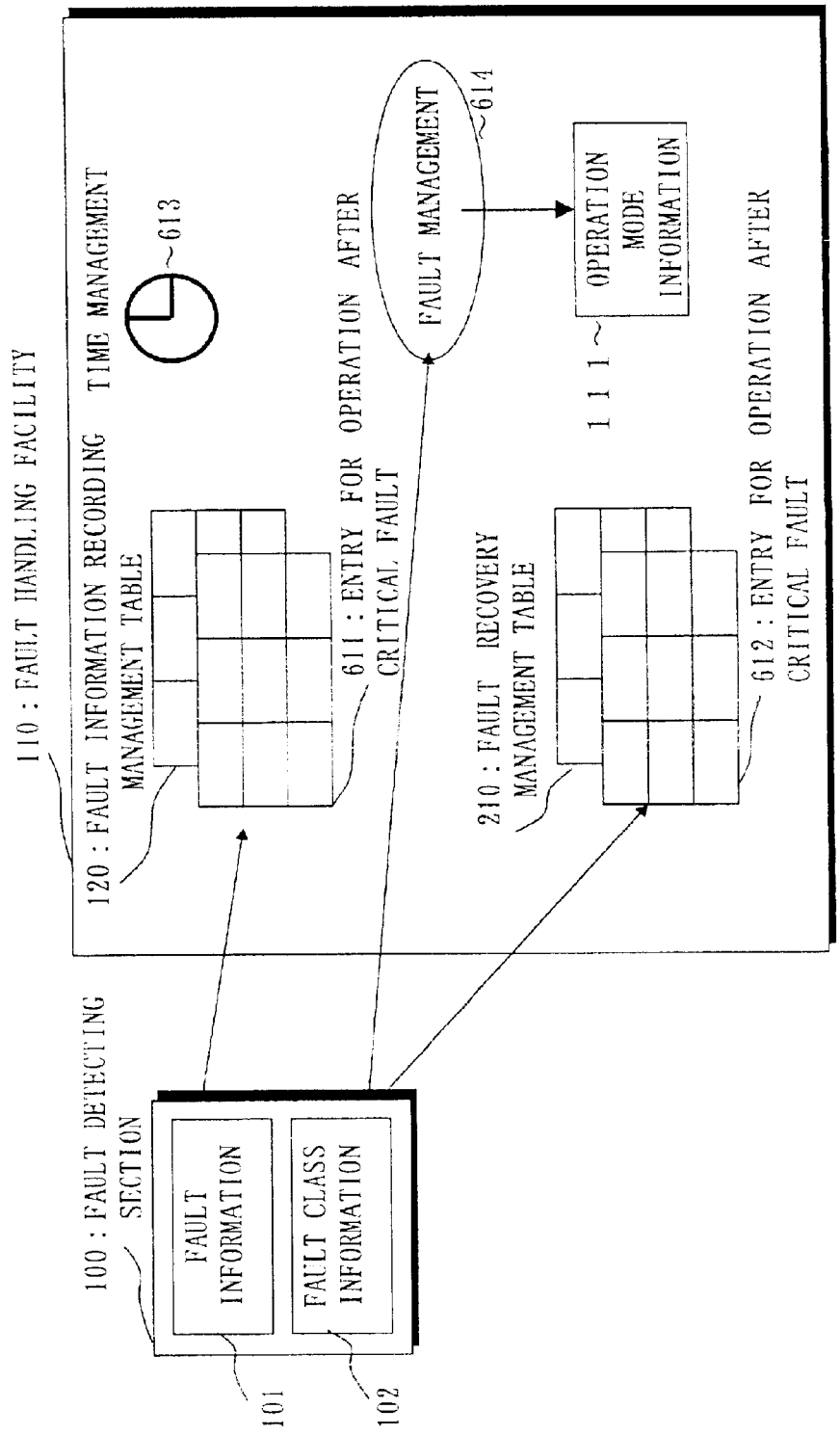
FIG. 11 shows a block diagram illustrating of an example of a fault handling system or a fault handling method according to a sixth embodiment of the present invention.

FIG. 11 shows a block diagram of the fault handling system for information processing system according to the sixth embodiment of the present invention.

Referring to the figure, elements sharing the reference numerals with the elements of FIG. 1, FIG. 2 and FIG. 4 are assumed to be the same elements as those discussed in the first and second embodiments. The fault handling facility 110 is provided with a fault management module 614 as a software module for performing the fault management. The fault management module 614 receives the fault information from the fault detecting section 100. The fault information recording management table 120 is provided with an entry 611 for operation after critical fault and the fault recovery management table 210 is provided with an entry 612 for operation after critical fault. Each of the entries 611, 612 corresponds to a special operation mode for operation after detecting a critical fault occurred in the information processing system.

The entry 611 for operation after critical fault is configured in the same manner as the configuration of the fault information recording management table 120. The entry 611 for operation after critical fault may alternatively be included in the fault information recording management table 120, or may be of a separate table.

The entry 612 for operation after critical fault is configured in the same manner as the configuration of the fault recovery management table 210. The entry 612 for operation after critical fault may alternatively be included in the fault recovery management table 210, or may be of a separate table.

A reference numeral 613 denotes a time management which holds time information.

Figure 12:
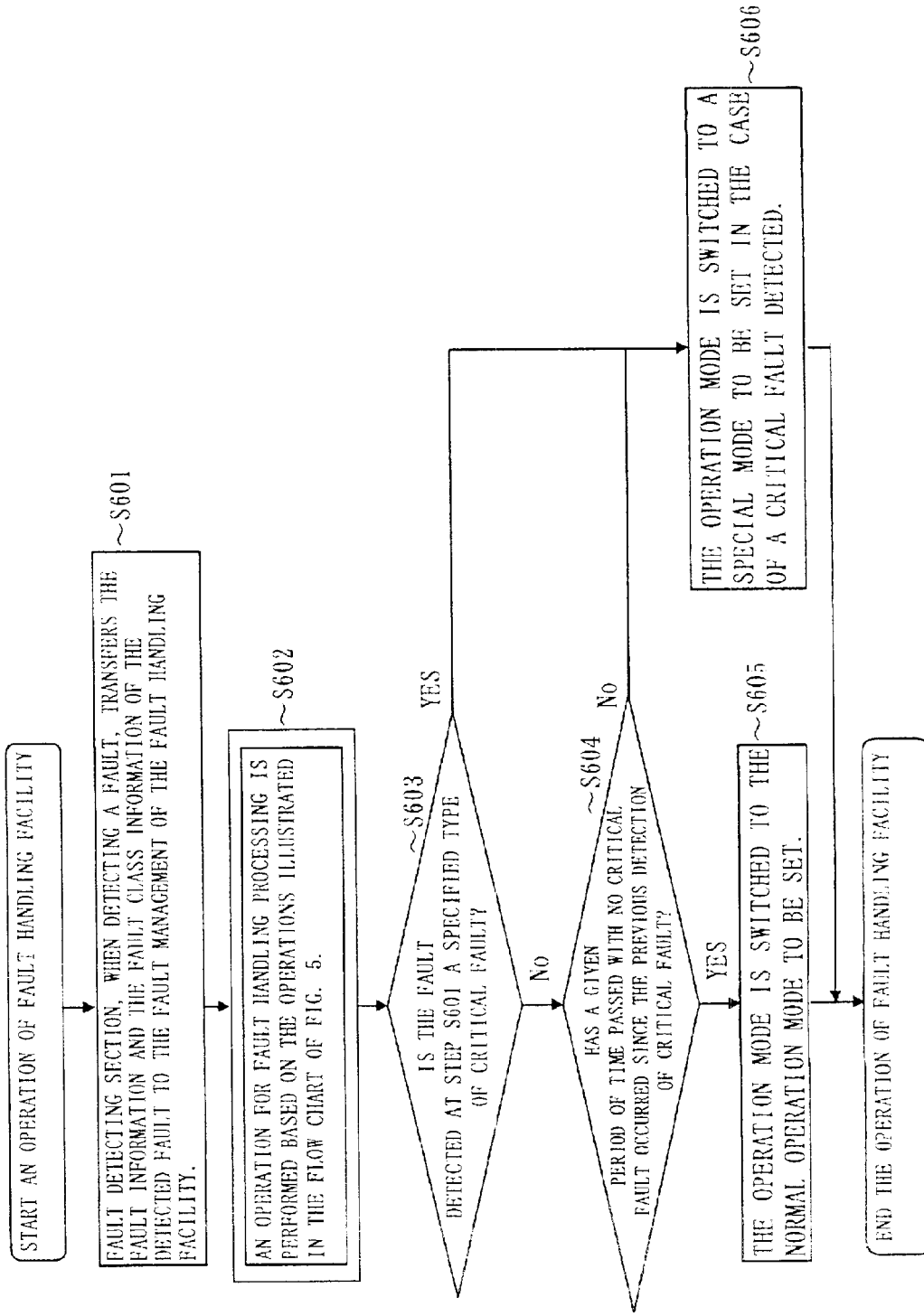
FIG. 12 is a flow chart illustrating an example of the operation of the fault handling system of the sixth embodiment.

An operation of the fault handling system according to the sixth embodiment of the present invention will be discussed with reference to a flow chart of FIG. 12.

The fault handling system of the sixth embodiment is discussed with a series of operations for fault handing processing performed by the fault handling facility 110.

When detecting a fault at a step S601, the fault detecting section 100 transfers the fault information 101 and the fault class information 102 to the fault management module 614 in the fault handling facility 110.

At a step S602, the fault management module 614 performs a series of the operations for fault handling processing illustrated in the flow chart of FIG. 5 discussed in the second embodiment based on the fault information 101, the fault class information 102 and the operation mode information 111.

At a next step S603, the fault detected at the step S601 is examined whether it is a type of critical fault specified in the fault management module 614 or not.

In the case of the detected fault being identified that it is not the specified type of critical fault, then it is examined at a step S604 whether a critical fault has occurred for the given period of time since the previous detection of a critical fault until the current time obtained from the time management or not.

In the case that the time has passed longer than the given period of time since the previous detection of the critical fault, the operation mode is switched back to the normal operation mode to be set. In the normal operation mode, a fault detected thereafter will be handled with the type of fault handling processing performed in the normal system operation.

In the case that the detected fault is identified as a specified type of critical fault at the step S603, or that the given period of time has not yet passed since the detection of the previous critical fault at the step S604, then it is judged that the system operation is unstable due to the previously detected critical fault. Then, the operation mode is switched to the type of operation mode for operation after detecting a critical fault occurred in the information processing system. As a result, a subsequent series of operations for fault handling processing will be performed based on the entry 611 for operation after critical fault corresponding to the type of the fault information recording management table 120 and the entry 612 for operation after critical fault corresponding to the type of the fault recovery management table 210.

Thus, according to the fault handling system for information processing system of the sixth embodiment, when the occurrence of a critical fault is detected, the operation mode is changed so as to change the type of the fault information recording processing and the type of the fault recovery processing adaptively. As a result, the special type of the fault handling processing which is different from the type of the fault handling processing performed in the normal system operation may be executed in the case that the system operation is unstable due to the critical fault. In addition to that, if no critical fault has been detected for the given period of time since the previous detection of a critical fault, it is judged that the system operation is and will be stable, and the operation mode is switched automatically back to the normal operation mode.

As aforementioned, the fault handling system for information processing system of this embodiment is characterized with the following features in addition to those of the fault handling system discussed in the second embodiment.

The fault handling system for information processing system is provided with the operation mode after detecting a critical fault, in which the fault information is recorded in detail and the special type of the fault recovery processing is performed after detecting a critical fault occurred in the information processing system. The fault handling system for information processing system is further provided with the entries of the fault information recording management table 120 and the fault recovery management table 210. Each of the entries records information set for the operation mode after detecting a critical fault.

The fault handling facility 110, after detecting a critical fault occurred in the information processing system, switches the operation mode information automatically to set the operation mode for operation after detecting a critical fault.

The fault handling facility 110, when detecting a stable system operation for the given period of time after the occurrence of a critical fault in the information processing system, changes the operation mode information automatically and switches the operation mode to the normal operation mode in which a detected fault is handled with the type of fault handling processing performed in the normal system operation.

Embodiment 7.

A fault handling system according to a seventh embodiment of the present invention has a new function added to the functions of the fault handling system discussed in the second embodiment. The fault handling system of this embodiment is provided with a function of detecting the system configuration of the information processing system. In other words, it is detected that the information processing system is included in a duplex (multiplex) system or a single system. Based on a detected result of the system configuration, the operation mode information is changed automatically. As a result, the type of fault handling processing may be changed automatically and adaptively according to the system configuration, i.e., a duplex (multiplex) system or a single system, of the information processing system.

The fault handling system of the seventh embodiment of the present invention will be discussed below with reference to the drawings.

Figure 13:
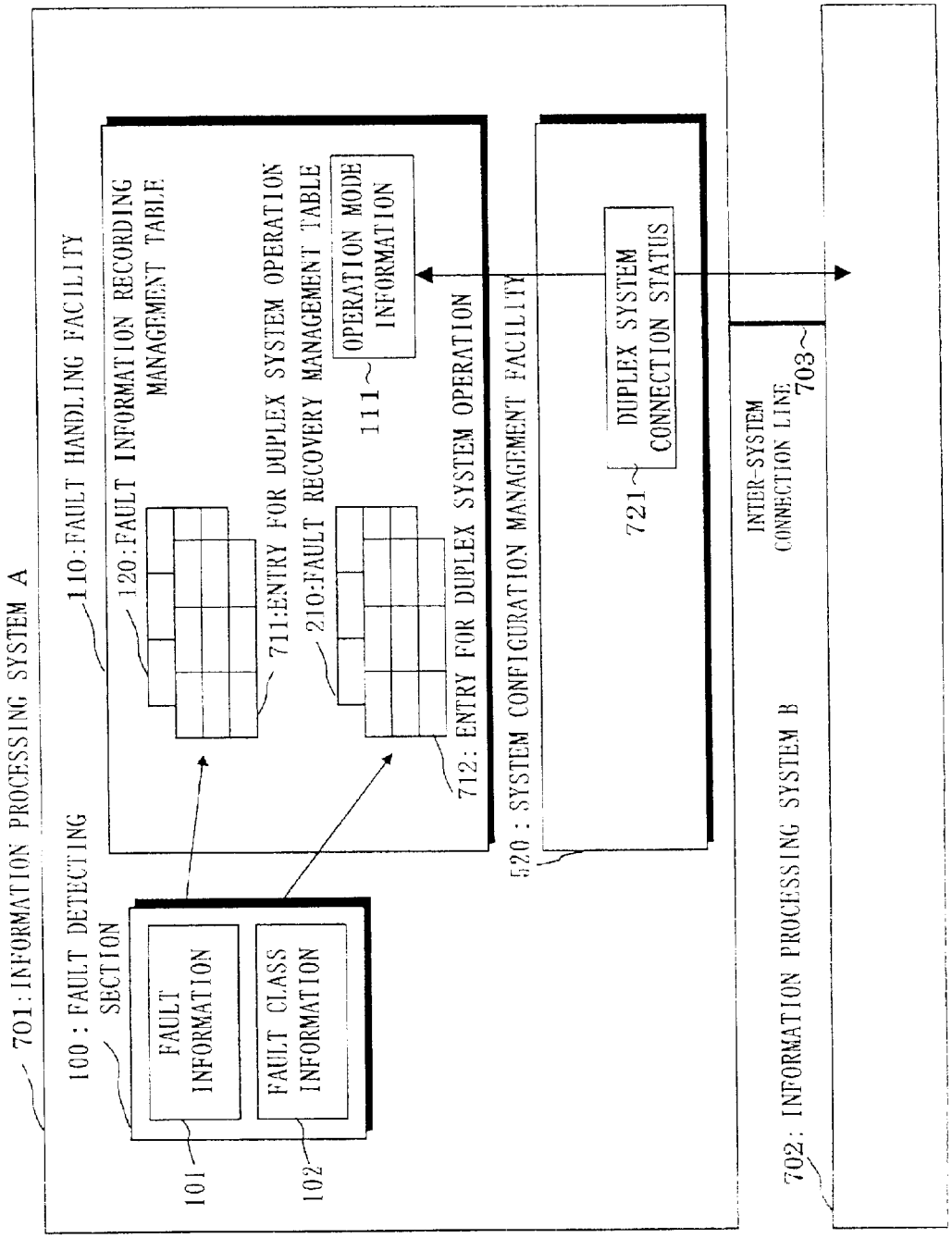
FIG. 13 shows a block diagram illustrating an example of a fault handling system or a fault handling method according to a seventh embodiment of the present invention.

FIG. 13 shows a block diagram of the fault handling system for information processing system according to the seventh embodiment of the present invention.

Referring to the figure, elements sharing the reference numerals with the elements of FIG. 1, FIG. 2 and FIG. 4 are assumed to be the same elements as those discussed in the first and second embodiments.

The fault information recording management table 120 is provided with an entry 711 for duplex system operation and the fault recovery management table 210 is provided with an entry 712 for duplex system operation, both corresponding to the operation mode for a duplex system operation.

The entry 711 for duplex system operation has the same configuration as that of the fault information recording management table 120. The entry 711 for duplex system operation may be included in the fault information recording management table 120, or may be of a separate table.

The entry 712 for duplex system operation has the same configuration as that of the fault recovery management table 210. The entry 712 for duplex system operation may be included in the fault information recording management table 210, or may be of a separate table.

In the seventh embodiment, it is assumed that an information processing system A is one of information processing systems in a duplex system including information processing systems A and B, or one of N number of information processing systems in a multiplex system. Referring to FIG. 13, a duplex system includes an information processing system 701 and an information processing system 702. The duplex system is provided with an inter-system connection line 703 to connect the information processing systems A and B for exchanging data with each other.

The system configuration management facility 520 detects the system configuration status of the information processing system A in the same manner as that discussed in the fifth embodiment. According to this embodiment, it is assumed that the system configuration management facility 520 detects that the information processing system A is included in a duplex system or a multiplex system including N number of information processing systems.

The system configuration management facility 520 confirms that the multiplex system configuration including the information processing system A by way of the inter-system connection line 703, and holds the information confirmed in a duplex system connection status 721.

Figure 14:
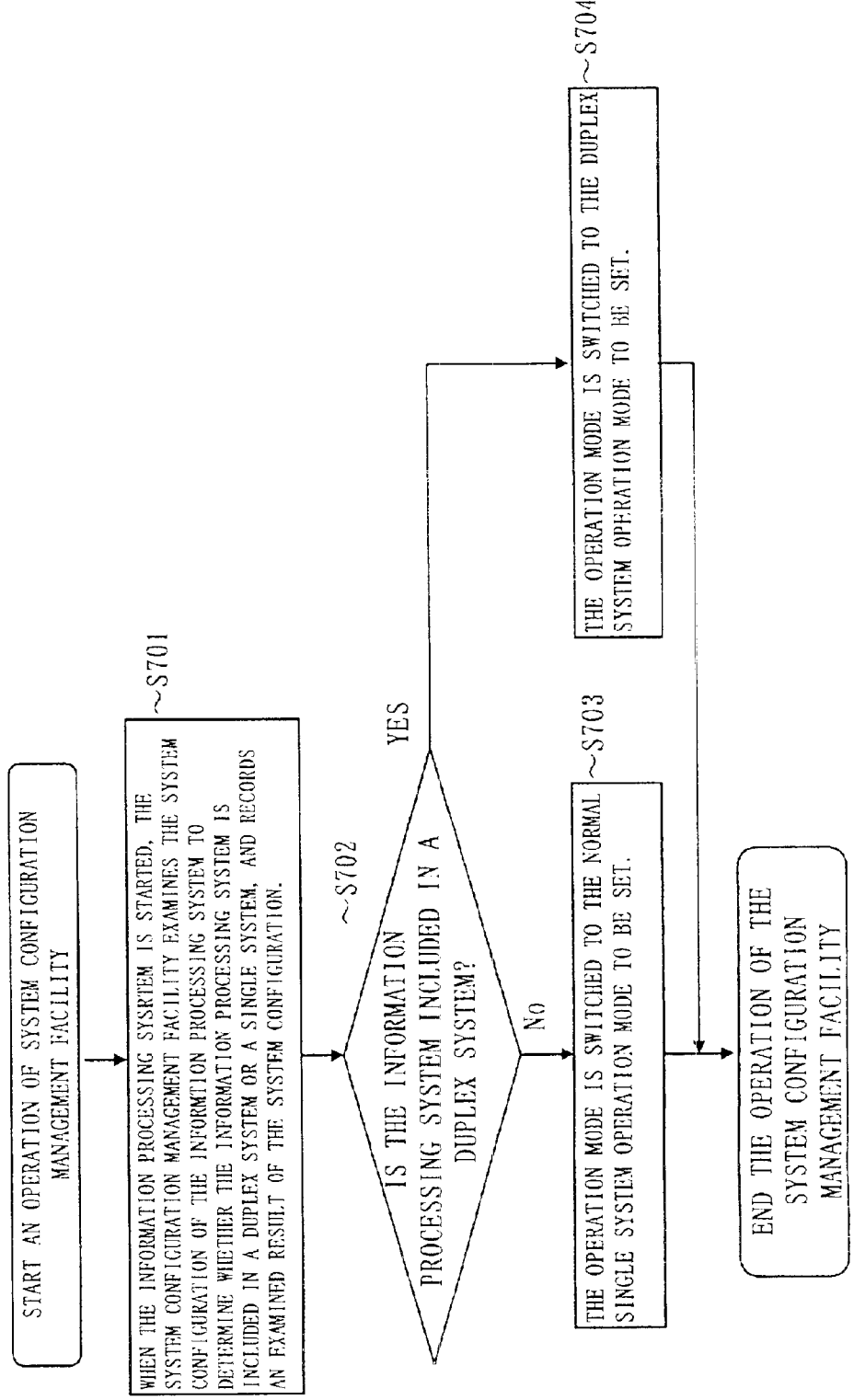
FIG. 14 is a flow chart illustrating an example of the operation of the fault handling system of the seventh embodiment.

An operation of the fault handling system of the seventh embodiment of the present invention will be discussed with reference to a flow chart of FIG. 14.

According to the seventh embodiment, the system configuration management facility 520 starts operating when the information processing system is activated.

The system configuration management facility 520 examines the system configuration of the information processing system at a step S701 to determine that the information processing system A is included in a duplex system, a multiplex system having N number of information processing systems, or a single system by way of the inter-system connection line 703. Then, the system configuration management facility 520 records an examined result of the system configuration in the duplex system connection status 721, for example.

Then, at a step S702, if it is determined that the information processing system A is included in a duplex system or a multiplex system including N number of information processing systems, the operation proceeds to a step S704. At the step S704, the operation mode set in the fault handling facility 110 is switched to the operation mode for a duplex system.

If it is determined that the information processing system is included in a single system at the step S702, then the operation proceeds to a step S703 where the operation mode is switched back to the normal operation mode. The operation mode determined at the step S703 or S704 is set as the operation mode information 111 in the fault handling facility 110.

As a result, if the information processing system is included in a duplex system or a multiplex system including N number of information processing systems, the entry of the fault information recording management table 120 and the entry of the fault recovery management table 210 in the fault handling facility 110 are changed, respectively, to the entry 711 for duplex system operation and the entry 712 for duplex system operation. In this manner, the type of fault handling processing for a duplex system may be changed.

Thus, the fault handling system for information processing system of the seventh embodiment detects that the information processing system is included in a multiplex system or a single system and changes the type of the fault information recording processing and the type of the fault recovery processing adaptively based on a detected result. As a result, if the information processing system is included in a multiplex system, the special type of fault handling processing which is different from the normal type of fault handling processing may be performed to handle a fault detected. Specifically, the special type of fault handling processing may include an operation for switching the information processing system with a fault detected to the other information processing system in a duplex system, for example, so as to conceal the fault detected even if the fault is only a minor one.

As aforementioned, the fault handling system for information processing system of this embodiment is characterized with the following features in addition to those of the fault handling system discussed in the second embodiment.

The fault handling system is provided with the system configuration management facility 520 for detecting that the information processing system is included in a duplex system or a single system.

The fault handling system is provided with the single system operation mode, in which a detected fault is handled with the type of fault handling processing optimal to the single system configuration, and the duplex system operation mode, in which a detected fault is handled with the type of fault handling processing optimal to the duplex system configuration. The fault handling system is further provided with the entries of the fault recovery management table 210 which record information set for the single system operation mode and the duplex system operation mode, respectively.

The system configuration management facility 520 automatically changes the operation mode information to select the single system operation mode when detecting that the information processing system is included in a single system. When detecting that the information processing system is included in a duplex system, the operation mode information is switched to select the duplex system operation mode. Thus, the type of fault recovery processing is switched automatically and adaptively according to the system configuration of the information processing system.

Embodiment 8.

A fault handling system of an eighth embodiment of the present invention has a new function added to the functions of the fault handling system discussed in the seventh embodiment. The fault handling system of this embodiment is provided with a function of detecting that the other information processing system in a duplex system is available for operation or not, and changing the operation mode information automatically and adaptively based on a detected result. As a result, the type of fault handling processing is allowed to be changed automatically and adaptively when the other information processing system in a duplex system is in a state of breakdown or in the engagement of an maintenance operation.

The fault handling system of the eighth embodiment of the present invention will be discussed below with reference to the drawings.

Figure 15:
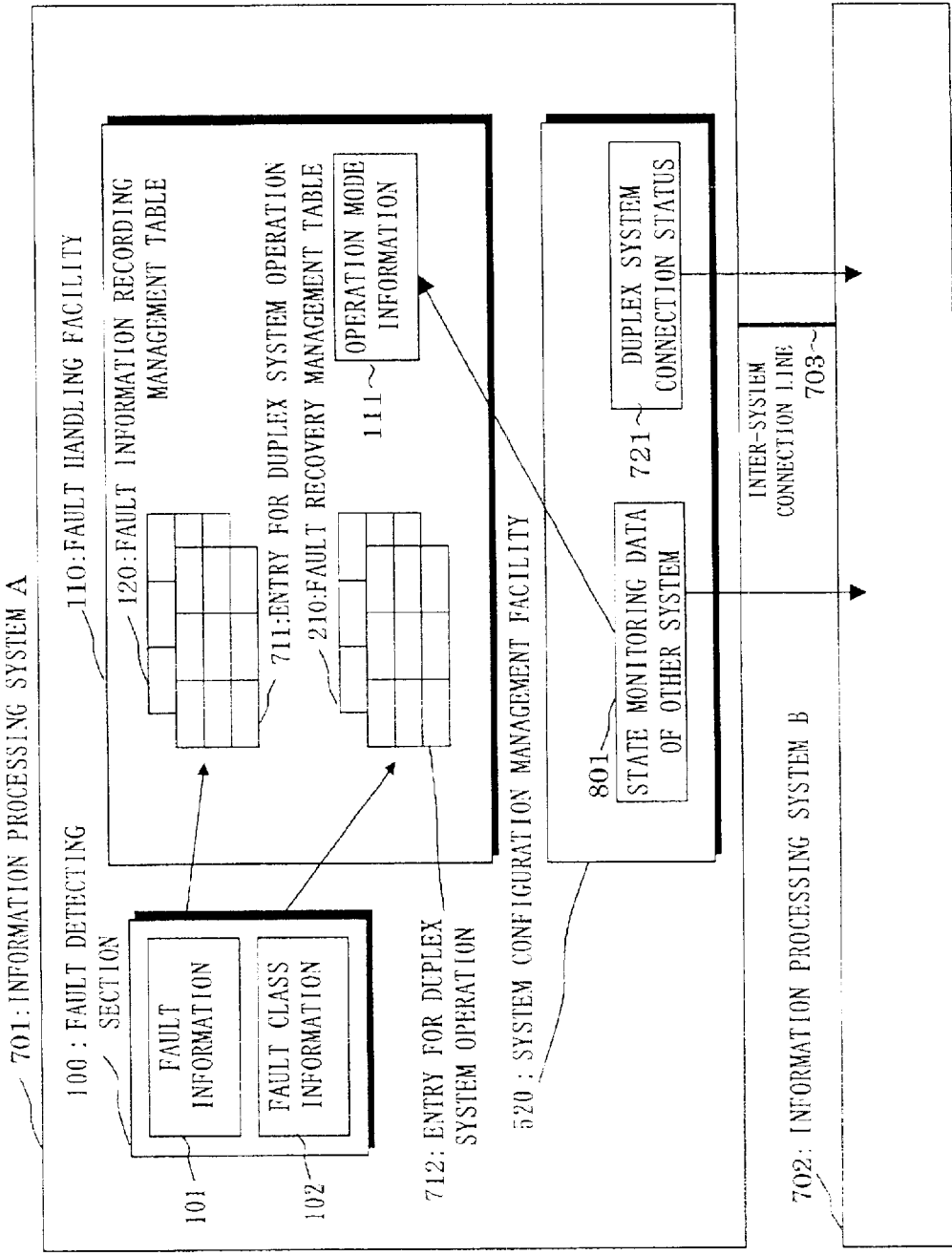
FIG. 15 shows a block diagram illustrating an example of a fault handling system or a fault handling method according to an eighth embodiment of the present invention.

FIG. 15 shows a block diagram of the fault handling system for information processing system according to the eighth embodiment of the present invention.

Referring to the figure, elements sharing the reference numerals with the elements of FIG. 13 are assumed to be the same elements as those discussed in the seventh embodiment. According to the eighth embodiment, the system configuration management facility 520 monitors the operating status of the other information processing system in a periodic manner and records a monitored result in the state monitoring data of other system 801.

Figure 16:
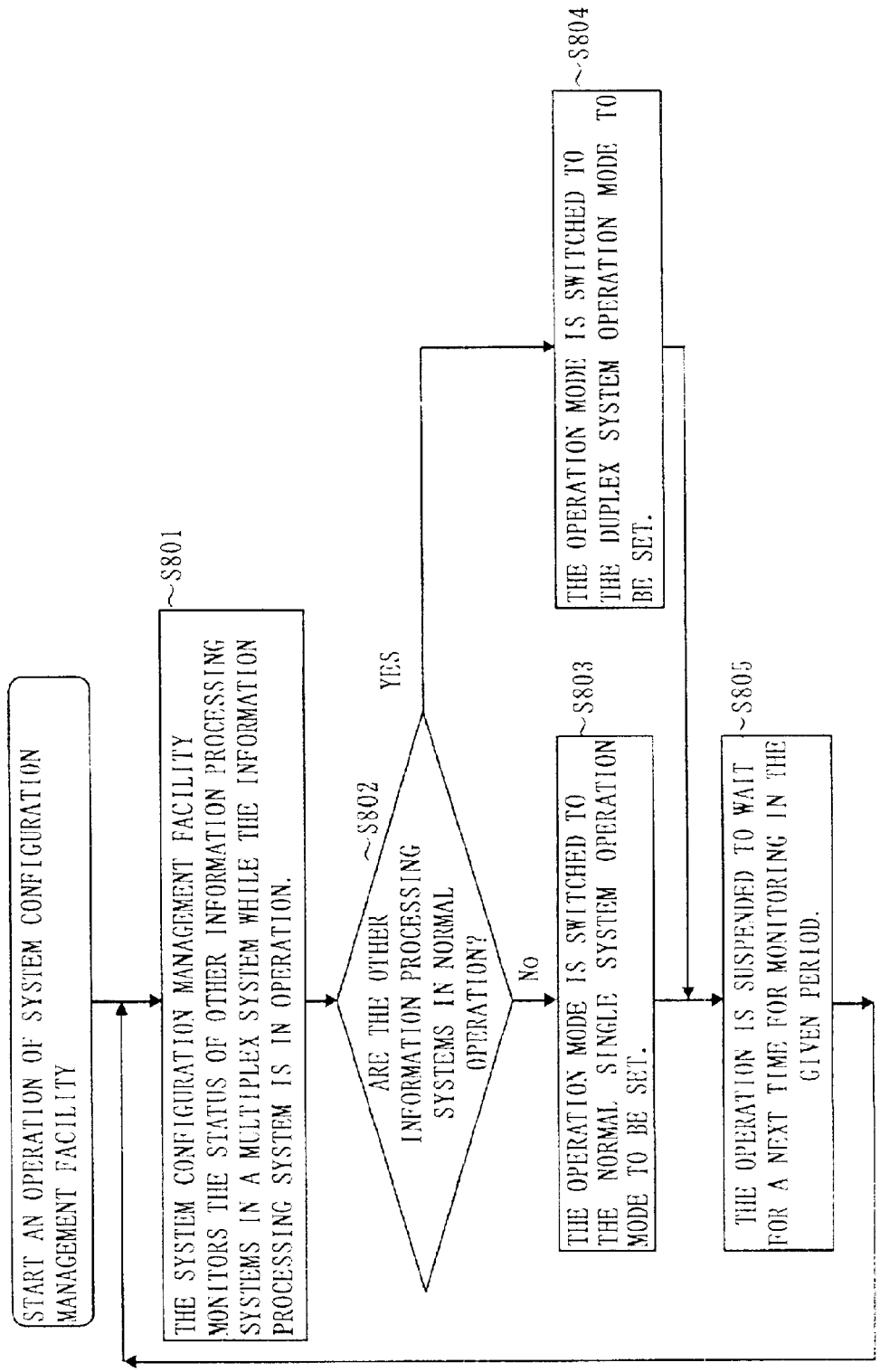
FIG. 16 is a flow chart illustrating an example of the operation of the fault handling system of the eighth embodiment.
Figure 17:
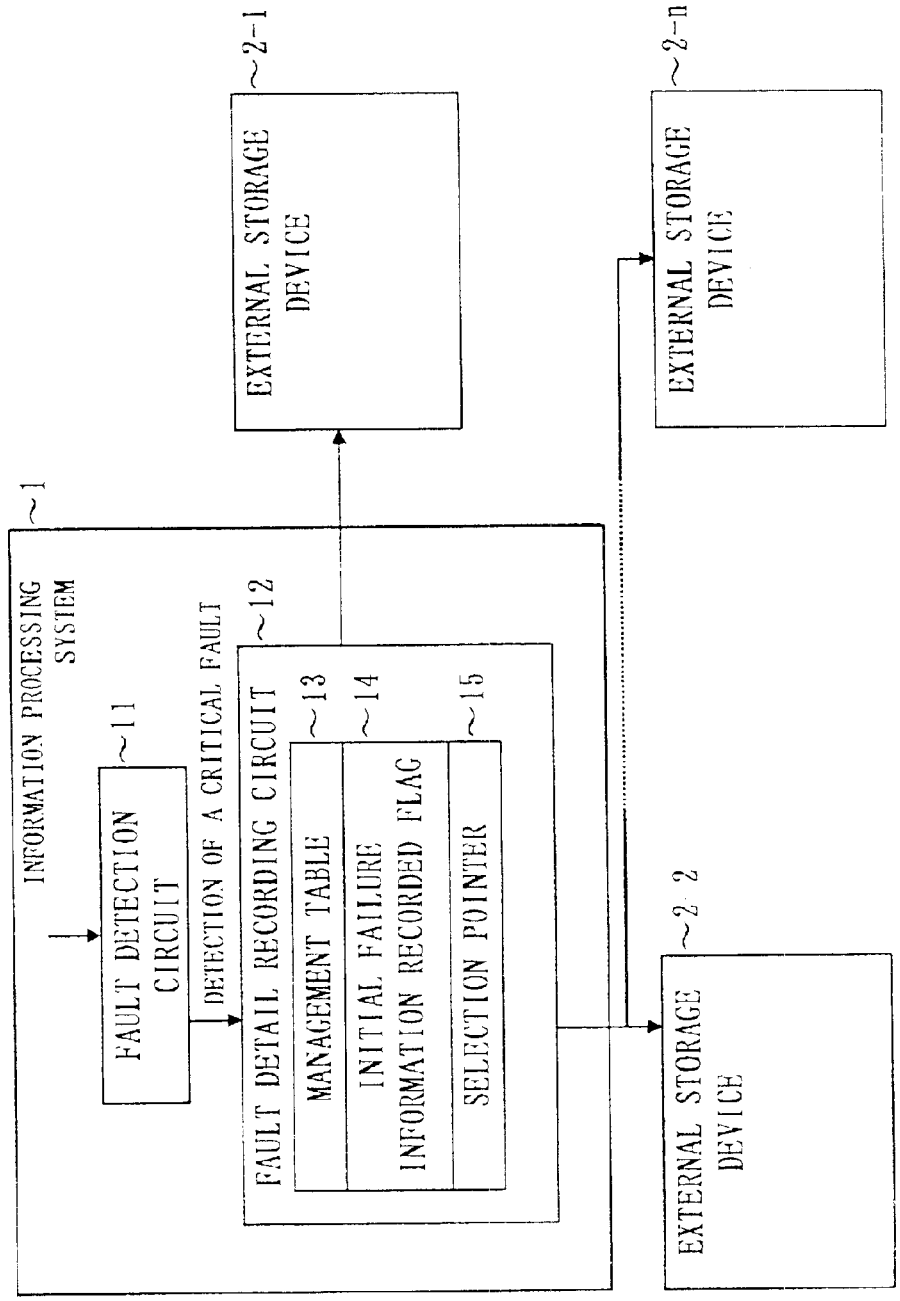
FIG. 17 shows a block diagram illustrating a conventional example of a fault handling system.

An operation of the fault handling system of the eighth embodiment of the present invention will be discussed with reference to a flow chart of FIG. 16.

According to the eighth embodiment, the system configuration management facility 520 operates in a regular manner during the system operation.

At a step S801, the system configuration management facility 520 monitors the operating status of the other processing system in a duplex system or another information processing system in a multiplex system.

As a result, in the case of detecting the other information processing system in the normal operation at a step S802, the operation mode is changed to select and set the duplex system operation mode at a step S804.

On the other hand, in the case of detecting the other information processing system in an abnormal operation at the step S802, then the operation mode is changed to select and set the normal single system mode at a step S803.

After setting the operation mode at the step S803, S804, the system configuration management facility 520 enters the wait state for monitoring the system configuration until a next periodic time, and repeats a series of the operations through the steps S801 to S805. In this manner, the operation mode is switched dynamically and adaptively according to the operating status of the other information processing system in a duplex system or another information processing system in a multiplex system during the system operation. The fault handling facility 110 selects either one of the entry 711 for duplex system operation in the fault information recording management table 120 and the entry 712 for duplex system operation in the fault recovery management table 210 according to the operation mode information set by the system configuration management facility 520. In this manner, the type of the fault handling processing is allowed to be changed dynamically.

Thus, according to the fault handling system for information processing system of the eighth embodiment, the operating status of the other information processing system in a duplex system, or another information processing system in a multiplex system, is monitored and change the type of the fault information recording processing and the type of the fault recovery processing adaptively during the system operation based on a monitored result. As a result, in case that the other information processing system in a duplex system is not available for operation due to a fault or an engagement in a maintenance operation, for example, the duplex system operation is switched back to the operation mode similar to the single system operation for performing the type of fault handling processing applicable to the single system operation.

As aforementioned, the fault handling system for information processing system of this embodiment is characterized with the following features in addition to those of the fault handling system discussed in the seventh embodiment.

The system configuration facility 520 monitors the operating status of the other information processing system in a duplex system, and detects that the other information processing system is available or not for operation. In the case of the other information processing system in a state of breakdown or in some other conditions which make the other information processing system incapable of operation.

In the case that the other information processing system in a duplex system is not available for operation, the system configuration facility 520 sets the operation mode information to select the single system operation mode automatically so as to perform the type of fault handling processing applicable to the single system operation.

Embodiment 9.

With reference to the previous embodiments 4 to 8, the fault handling system is discussed with a set of the fault information recording management table 120 and the fault recovery management table 210 an example of the fault management table 140. Alternatively, however, a single table of either one of the fault information recording management table 120 and the fault recovery management table 210 may be employed as the fault management table 140 according to the present invention.

Corresponding to the above alternative case of the fault management table 140, the fault handling section 150 may also be provided with either one of the fault information recording processing section 130 and the fault recovery processing section 220. In the case that the fault information recording management table 120 is used as the fault management table 140, the fault information recording processing section 130 is to be used as the fault handling section 150. In the case that the fault recovery management table 210 is used as the fault management table 140, then the fault recovery processing section 220 is to be used as the fault handling section 150.

Embodiment 10.

With reference to the first embodiment of FIG. 1, the fault handling system is discussed with a set of the fault information recording management table 120 and the fault recovery management table 210 an example of the fault management table 140. However, the fault management table 140 may not be limited to the configuration of the fault handling system discussed with reference to FIG. 1. Alternatively, another type of the fault management table 140 may be applicable to the fault handling system of the present invention.

With reference to the first or second embodiment, the fault handling system is discussed with the fault management table 140 as an example. The fault management table 140 may alternatively be replaced by another type of the fault management table 140 which stores the type of fault handling processing for handling a fault occurred in an information processing system. Similarly, the fault handling section 150 may alternatively be replaced by another type of the fault handling section 150 which is provided with a module for providing the fault handling processing.

Those alternative configurations aforementioned are also applicable to the types of the fault management table 140 and the fault handling section 150 discussed in the previous embodiments 3 to 8.

With reference to the previous embodiments 1 to 8, the fault handling system is discussed with the fault management table 140 being provided in the fault handling facility 110. However, the fault management table of this embodiment may not be limited to this configuration of the fault handling system. The fault management table 140 may alternatively be replaced by another type of the fault management table 140 which is provided in the storage area of the information processing system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fault handling system which detects a fault in an information processing system and performs fault handling processing corresponding to the detected fault in the information processing system, the fault handling system comprising:

a fault management table for storing operation mode information indicating an operating mode of the information processing system and a type of the fault handling processing corresponding to the detected fault in the information processing system, the operation mode information being related with the type of the fault handling processing; and a fault handling facility for determining the operation mode information and for obtaining the type of the fault handling processing corresponding to the operation mode information determined from the fault management table, wherein the operating mode is independent of a current process being performed by the information processing system.

2. The fault handling system of claim 1, further comprising a fault detecting section for detecting a fault in the information processing system, for determining fault class information indicating a degree of seriousness of the fault detected and for outputting the fault class information determined to the fault handling facility;

wherein the fault management table stores the fault class information and the type of the fault handling processing, the operation mode information being related with the type of the fault handling processing, and wherein the fault handling facility inputs the fault class information from the fault detecting section and obtains the type of the fault handling processing corresponding to the fault class information inputted from the fault management table.

3. The fault handling system of claim 1, further comprising:

a fault handling section including a module for providing the fault handling processing;

wherein the fault handling facility notifies the fault handling section of the type of the fault handling processing obtained, and wherein the fault handling section starts the module for providing the type of the fault handling processing notified.

4. The fault handling system of claim 1, wherein the type of the fault handling processing includes a type of fault information recording processing for recording the fault detected, and wherein the fault management table includes a fault information recording management table for storing the operation mode and the type of fault information recording processing, the operation mode information being related with the type of fault information recording processing.

5. The fault handling system of claim 1, wherein the type of the fault handling processing includes a type of the fault recovery processing, and wherein the fault management table includes a fault recovery management table for storing the operation mode and the type of fault recovery processing, the operation mode information being related with the type of fault recovery processing.

6. The fault handling system of claim 1, further comprising an operating status input section for inputting the operating status of the information processing system;

wherein the fault handling facility inputs the operating status being inputted from the operating status input section and determines the operation mode information according to the operating status inputted.

7. The fault handling system of claim 1, further comprising an attached device management facility for detecting an attached device connected with the information processing system;

wherein the fault handling facility determines the operation mode information based on the attached device detected by the attached device management facility.

8. The fault handling system of claim 7, wherein the operation mode information includes operation mode information indicating the operating status of the information processing system depending on a type of the attached device connected with the information processing system;

wherein the type of the fault handling processing includes the type of the fault handling processing depending on the type of the attached device connected with the information processing system, and wherein the fault management table stores the type of the fault handling processing and the operation mode information, the operation mode information being related with the type of the fault handling processing according to the type of the attached device connected with the information processing system.

9. The fault handling system of claim 1, further comprising a system configuration management facility for examining a system configuration of the information processing system to define a type of system configuration and for notifying the fault handling facility of the type of system configuration defined;

wherein the fault handling facility determines the operation mode information based on the type of system configuration notified by the system configuration management facility.

10. The fault handling system of claim 9, wherein the operation mode information includes operation mode information indicating the operating status of the information processing system depending on the type of system configuration;

wherein the type of the fault handling processing includes the type of the fault handling processing corresponding to the type of system configuration, and wherein the fault management table stores the type of the fault handling processing and the operation mode information, the type of the fault handling processing being related with the operation mode information based on the type of system configuration.

11. The fault handling system of claim 9, wherein the type of system configuration includes one of an installing system configuration and an updating system configuration.

12. The fault handling system of claim 9, wherein the type of system configuration includes one of a duplex system configuration and a single system configuration.

13. The fault handling system of claim 12, wherein the system configuration management facility monitors the operating status of the information processing system in a duplex system, and switches the operation mode to a single system operation in a case that another system in the duplex system is not in execution.

14. The fault handling system of claim 2, wherein the fault handling facility determines the operation mode information based on the fault detected in the information processing system by the fault detecting section.

15. The fault handling system of claim 14, wherein the fault handling facility detects that the information processing system has recovered from the fault detected and determines the operation mode based on a detected result.

16. A fault handling method, comprising;

defining operation mode information indicating an operating mode of an information processing system, and a type of fault handling processing corresponding to a fault in the information processing system;

storing the operation mode information and the type of fault handling processing defined, the operation mode information being related with the type of fault handling processing;

detecting a fault in the information processing system;

obtaining an operation mode of the information processing system when the fault is detected, determining the type of fault handling processing corresponding to the operation mode information obtained; and handling the fault detected by using the determined type of fault handling processing, wherein the operating mode is independent of a current process being performed by the information processing system.

17. A method of handling a fault that has been detected in an information handling system that is operating in one of a plurality of operating modes, wherein the operating mode is independent of a current process being performed by the information processing system comprising:

classifying the detected fault in the information handling system into one of a plurality of fault types;

determining the operating mode of the information handling system;

determining a fault handling process from among a plurality of fault handling processes based on the determined fault type and the determined operating mode of the information handling system; and executing the determined fault handling process to handle the fault.

18. The method of handling a fault according to claim 17, wherein the operating mode includes a development operating mode, a test verification mode, a maintenance mode, and a normal operation mode.

19. The method of handling a fault according to claim 17, wherein the operating mode is dependent upon a connection status of a peripheral device to which the information handling system is operatively connected.

20. The method of handling a fault according to claim 17, wherein the information handling system is a first information handling system operatively connected to a second information handling system in a duplex system configuration, wherein the operating mode is dependent upon a status of the second information handling system.

21. The method of handling a fault according to claim 20, wherein the status of the second information handling system is a connection status with the first information handing system.

22. The method of handling a fault according to claim 17, wherein the operating mode is dependent upon whether a software module of the information handling system has been recently updated.

23. The method of handling a fault according to claim 17, wherein the fault handling processes include processes for outputting fault information and processes for correcting the fault.

24. The method of handling a fault according to claim 17, further comprising:

classifying the detected fault type into one of a plurality of fault classes indicating various degrees of fault seriousness, said determining step determining the fault handling process from among a plurality of fault handling processes based on the determined fault type, the fault class and the determined operating mode of the information handling system.

* * * * *